United States Patent
Rice

(10) Patent No.: US 12,243,101 B2
(45) Date of Patent: Mar. 4, 2025

(54) SYSTEMS AND METHODS FOR DIGITAL OR CRYPTOGRAPHIC MEDIA, ASSETS, OR TOKENS LINKED TO PHYSICAL OBJECTS, SERVICES, OR PRIVILEGES IN THE REAL-WORLD

(71) Applicant: Transmira, Inc., Raleigh, NC (US)

(72) Inventor: Robert A. Rice, Raleigh, NC (US)

( * ) Notice: Subject to any disclaimer, the term of this patent is extended or adjusted under 35 U.S.C. 154(b) by 0 days.

(21) Appl. No.: 18/616,359

(22) Filed: Mar. 26, 2024

(65) Prior Publication Data
US 2024/0242287 A1 Jul. 18, 2024

Related U.S. Application Data

(63) Continuation-in-part of application No. 17/328,469, filed on May 24, 2021.

(51) Int. Cl.
*G06Q 40/06* (2012.01)

(52) U.S. Cl.
CPC ....... *G06Q 40/06* (2013.01); *G06Q 2220/165* (2013.01)

(58) Field of Classification Search
None
See application file for complete search history.

(56) References Cited

U.S. PATENT DOCUMENTS

| | | | | |
|---|---|---|---|---|
| 9,258,312 B1* | 2/2016 | O'Neill | .................... | H04L 63/10 |
| 11,057,369 B2* | 7/2021 | Cage | .................. | G06Q 20/3821 |
| 11,216,802 B2* | 1/2022 | Overholser | ........ | G06Q 20/3678 |
| 11,656,835 B1* | 5/2023 | Rice | ....................... | G06F 3/1454 |
| | | | | 345/419 |
| 2003/0018576 A1* | 1/2003 | Zuckerbrot | ............ | G06Q 40/03 |
| | | | | 705/38 |
| 2004/0209596 A1* | 10/2004 | Wong | .................. | G06Q 20/4037 |
| | | | | 455/405 |
| 2009/0018965 A1* | 1/2009 | Neydavood | .......... | G06Q 50/188 |
| | | | | 705/26.1 |
| 2014/0052558 A1* | 2/2014 | Rogel | .................... | G06Q 30/06 |
| | | | | 705/26.1 |
| 2015/0261425 A1* | 9/2015 | Marusich | .............. | G06F 3/0481 |
| | | | | 715/719 |

(Continued)

OTHER PUBLICATIONS

Frezal, C., et al., "New Digital Technologies to Tackle Trade in Illegal Pesticides," OECD Trade and Environment Working Papers, 2020.2: 0_1, 2, 4-35. Paris: Organization for Economic Cooperation and Development (OECD). (Year: 2020).*

(Continued)

*Primary Examiner* — Nicholas D Rosen

(57) ABSTRACT

Disclosed herein are systems and methods for item acquisition by selection of a virtual object placed in digital environment. According to an aspect, a system may include a display, a user interface, an image capture device, and at least one processor and memory. The processor(s) and memory may be configured to receive a coordinate for placement of a virtual object in a digital environment. The processor(s) and memory may also control the display to display the virtual object when a position corresponding to the received coordinate is within a field of view of the image capture device. Further, the processor(s) and memory may receive an input via the user interface for selecting the virtual object.

17 Claims, 22 Drawing Sheets

(56) References Cited

U.S. PATENT DOCUMENTS

| | | | |
|---|---|---|---|
| 2017/0331888 A1* | 11/2017 | Yoon | H04L 67/1095 |
| 2017/0331896 A1* | 11/2017 | Holloway | H04L 67/04 |
| 2018/0068130 A1* | 3/2018 | Chan | G06F 21/606 |
| 2020/0051067 A1* | 2/2020 | Overholser | G06F 16/1834 |
| 2020/0089895 A1* | 3/2020 | Gollogly | G06F 16/1865 |
| 2020/0213292 A1* | 7/2020 | Cage | H04L 63/10 |
| 2023/0117430 A1* | 4/2023 | Quigley | G06Q 50/12 |
| | | | 705/65 |

OTHER PUBLICATIONS

Ratigan, S., "Beware the slippery slope of sales tax: get firm footing with these eight audit-ready best practices," Strategic Finance 95:11: 41. Institute of Management Accountant, May 2014. (Year: 2014).*

* cited by examiner

Example 15: In-system, In-application

SYSTEMS AND METHODS FOR DIGITAL OR CRYPTOGRAPHIC MEDIA, ASSETS, OR TOKENS LINKED TO PHYSICAL OBJECTS, SERVICES, OR PRIVILEGES IN THE REAL-WORLD

CROSS-REFERENCE TO RELATED APPLICATION

This application is a continuation-in-part of U.S. application Ser. No. 17/328,469, filed May 24, 2021, entitled "Systems and Methods for Item Acquisition by Selection of a Virtual Object Placed in a Digital Environment", which is incorporated by reference herein in its entirety.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

The concept of ownership is traditionally based on possession. In the early days of commerce, it became convenient to use items or tokens to represent something else, particularly with regards to currency. Paper money, "backed by gold", was representative of an amount of gold, and much easier to trade or transfer between merchants or sellers and buyers than it was to carry around large amounts of coins.

In today's world there are many ways of recording or representing ownership such as the title of a car, the deed to a house, or a bearer bond. These instruments and others are either equivalent to something of value (like paper currency), representative of it (a stock certificate), or exchangeable for something of value (like food stamps).

With the advent of the internet, the Web, Web 2.0, Web 3.0, Blockchain, digital banking, and cryptocurrency, a new digital-based economy has emerged, first embracing traditional methods of finance and commerce, and then innovating new ways of commerce, finance, banking, transferring value, negotiating and processing transactions.

However, in most of these cases it is the transaction itself and methods of transacting (or buying/selling) that have evolved in the new digital economy (credit cards, bank transfers, ACH transfers, western union, paypal, cryptocurrency).

SUMMARY

Disclosed herein are systems and methods for item acquisition by selection of a virtual object placed in digital environment. According to an aspect, a system may include a display, a user interface, an image capture device, and at least one processor and memory. The processor(s) and memory may be configured to receive a coordinate for placement of a virtual object in a digital environment. The processor(s) and memory may also control the display to display the virtual object when a position corresponding to the received coordinate is within a field of view of the image capture device. Further, the processor(s) and memory may receive an input via the user interface for selecting the virtual object. The processor(s) and memory may also associate with a user a credit for transaction or transfer in response to receipt of the input.

According to another aspect, a system may include a computing device comprising a communications module configured to communicate with other computing devices via a network. The computing device may also include an augmented reality or virtual reality manager configured to maintain a database that identifies a plurality of virtual objects and a coordinate of each of the virtual objects in a digital environment. Further, the augmented reality or virtual reality manager may associate, for each virtual object, a credit for transaction or transfer. The augmented reality or virtual reality manager may also use the communications module to communicate, to the other computing devices via the network, identification of at least one virtual object and the coordinate of the at least one virtual object.

Whether we represent 10 cows on a voucher or 10 tickets and we move from 10 gold pieces to paper money that represents 10 gold pieces, the idea of representing one thing as something else for convenience is not new. However, the innovation is representing something physical in the real world with something digital such as a digital media asset (such as a 2D image or 3D object) and/or a cryptographic token (which can also be represented as a digital media asset). Further, beyond a simple representation of the physical object, digital cryptographic token (i.e. NFT), or both, the digital media asset confers acquisition and ownership of the physical object and the digital token, and vice versa. Acquiring any of the three grants rights to acquire and/or ownership of the others. And finally, the digital media asset may have its own properties, behaviors, and interactions, generally within various modalities that include games, virtual spaces, virtual reality, augmented reality, and so forth.

The ability to represent physical objects as a digital media asset, making one equivalent to the other in multiple respects, is necessary for the continuing evolution of commerce and the new digital economy, especially in regards to Web 3.0 and the Metaverse (inclusive of AR, VR, MR, and XR).

BRIEF DESCRIPTION OF THE DRAWINGS

The foregoing summary, as well as the following detailed description of preferred embodiments, is better understood when read in conjunction with the appended drawings. For the purposes of illustration, there is shown in the drawing's exemplary embodiments; however, the present disclosure is not limited to the specific methods and instrumentalities disclosed. In the drawings.

DETAILED DESCRIPTION

Figure 1:
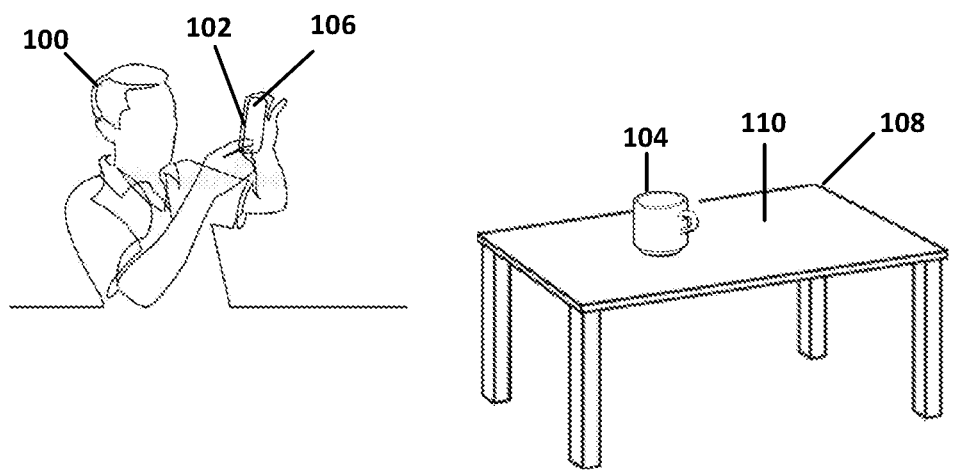
FIG. 1 is a view of a person holding a smartphone for viewing a virtual object 104 within a digital environment and for user in acquiring an item associated with the virtual object in accordance with embodiments of the present disclosure.

The present disclosure is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

As referred to herein, the term "computing device" should be broadly construed. It can include any type of mobile device, for example, a smartphone, a smart watch, a cell phone, a pager, a personal digital assistant (PDA, e.g., with GPRS NIC), a mobile computer with a smart phone client, or the like. A computing device can also include any type of conventional computer, for example, a desktop computer, a laptop computer, a netbook computer, a notebook computer, a server, or the like. A typical mobile device is a wireless data access-enabled device, such as in a non-limiting example, an iPHONE® smart phone, a BLACKBERRY® smart phone, a NEXUS ONE™ smart phone, iPAD® device, an ANDROID compatible device, a SAMSUNG® device (e.g., SAMSUNG GALAXY® smart phone), or the like, that is capable of sending and receiving data in a wireless manner using protocols like the Internet Protocol, or IP, and the wireless application protocol, or WAP. This allows users to access information via wireless devices, such as smart phones, mobile phones, pagers, two-way radios, communicators, and the like. Wireless data access is supported by many wireless networks, including, but not limited to, CDPD, CDMA, GSM, PDC, PHS, TDMA, FLEX, ReFLEX, iDEN, TETRA, DECT, DataTAC, Mobitex, EDGE and other 2G, 3G, 4G, 5G, and LTE technologies, and it operates with many handheld device operating systems, such as PalmOS, EPOC, Windows CE, FLEXOS, OS/9, JavaOS, iOS and Android. Typically, these devices use graphical displays and can access the Internet, or other communications network, on so-called mini- or micro-browsers, which are web browsers with small file sizes that can accommodate the reduced memory constraints of wireless networks, on other client applications accessed via the graphical displays, on client applications that do not utilize a graphical display, or the like. In a representative embodiment, the mobile device is a cellular telephone or smart phone that operates over GPRS (General Packet Radio Services), which is a data technology for GSM networks. In addition to a conventional voice communication, a given mobile device can communicate with another such device via many different types of message transfer techniques, including SMS (short message service), enhanced SMS (EMS), multi-media message (MMS), email WAP, paging, or other known or later-developed wireless data formats. Although many of the examples provided herein are implemented on a mobile device, the examples may similarly be implemented on any suitable computing device. Computing devices may include wearable devices having displays and/or other user interfaces.

As referred to herein, a "user interface" is generally a system by which users interact with a computing device. A user interface can include an input for allowing users to manipulate a computing device, and can include an output for allowing the system to present information and/or data, indicate the effects of the user's manipulation, etc. In a non-limiting example of a user interface on a computing device, which may include any device with a data processor and data communication capability, includes a graphical user interface (GUI) that allows users to interact with programs in more ways than typing. A GUI typically can offer display objects, and visual indicators, as opposed to text-based interfaces, typed command labels or text navigation to represent information and actions available to a user. In a non-limiting example, a user interface can be a display window or display object, which is selectable by a user of a mobile device for interaction. The display object can be displayed on a display screen of a mobile device and can be selected by, and interacted with by, a user using the user interface. In a non-limiting example, the display of the mobile device can be a touch screen, which can display the display icon. The user can depress the area of the display screen at which the display icon is displayed for selecting the display icon. In an alternative example, the user can use any other suitable interface of a mobile device, such as a keypad, to select the display icon or display object, or the user can use a track ball or arrow keys for moving a cursor to highlight and select the display object.

User interfaces and GUIs may be affected by interaction with sensor devices, wearables, or computer vision interfaces where the user's motion is tracked by a device using computer vision techniques as the way to interact with the interface. In a non-limiting example, a person may wave his or her hand in front of an automatic door, and the sensor picks up the movement and triggers the door opening.

In similar fashion, some advanced AR and VR interfaces may track the fingers, hands, arms of the user for interaction, without needing other interfaces like keyboards, mice, or handheld/wearable devices or pointers.

As referred to herein, a "communication channel" is any suitable type of connection between computing devices in which data may be exchanged. In a non-limiting example, a communication channel may be established between computing devices via a telephone call, an email communication, a text message communication, an instant message communication, and the like.

As referred to herein, "Tangible" describes physical objects that include but are not limited to objects, assets, products, goods, merchandise and other objects such as, in non-limiting examples, manufactured items, coffee, vehicles, art, gems, jewelry, tickets, title to a house or car, certificates of ownership, and other items having a physical existence in the real world.

As referred to herein, "Intangible" describes objects that include but are not limited to services, coupons, special offers, vouchers, credits, privileges (such as membership, rights, perks, etc.), access (such as to an event), currency, or cryptocurrency.

As referred to herein, a "physical object" is a tangible, physical device or item having a physical presence and is something having a value in the real world including but not limited to one or more tangible and/or intangible objects, assets, products, goods, merchandise, services, vouchers, coupons, redeemables, special offers, credits, certificates, credentials, titles, membership, privileges, rights, access (such as access to an event, sale, promotion, back-stage, VIP area, etc.), or currency.

In a non-limiting example, a "Physical Object" may be an object, such as a pair of sneakers or a specific object such as a particular pair of sneakers that is identifiable and distinct from others, generally with some standout feature or other unique identifier. Additionally, a "Physical Object" may consist of rights to create, print, 3D print, produce, manufacture, fabricate or customize a new or existing physical object. In a further non-limiting example, a virtual goods object may confer rights to the owner to 3D print an object or receive a customized pair of sneakers to be manufactured at some point in the future as part of a promotion.

As referred to herein, a "3D object" is a non-tangible, three-dimensional object in digital form, rendered, displayed, visualized, simulated, and/or interacted with through a software application. Such software application may be, by way of non-limiting example, a 3D viewer, application, web browser, extension, plugin, wallet, exchange, marketplace, game, virtual world, virtual reality, and/or augmented reality. It may be represented, referenced, or visualized as a 2D image, animation, icon, symbol, logo, token, or other visual medium in any application.

As referred to herein, a "virtual goods object" (or "VGO") is a two-dimensional or three-dimensional object that is rendered, displayed, visualized, and/or interacted with in a 2D or 3D environment such as, by way of non-limiting example, a 3D space, scene, browser, extension, plugin, application, viewer, wallet, exchange, marketplace, and/or interface, but which two-dimensional or three-dimensional object is linked to, or associated with, a real-world object, asset, item, or offer and can be redeemed, exchanged, or converted, to take ownership of or grant rights, privileges, or access to the same. Any VGO described herein may be rendered, displayed, visualized, simulated, and/or interacted with by Augmented Reality technology, Virtual Reality technology, Web technology, or any hybrid of Augmented and Virtual Reality and Web technology.

As used herein, "3D object" and "virtual goods object" may be, by way of non-limiting example, 3D polygonal or voxel objects or other 2D or 3D representations in Augmented Reality, Virtual Reality, or Web or Application, and may have one or more visual representations, levels of detail, or visual features including brand logos, names, marks, icons, symbols, or slogans.

As referred to herein, a "Token" is defined as including but not limited to one or more entries in a database, digital ledger, a cryptographic ledger such as a blockchain, or cryptographic token (fungible, non-fungible, or semi-fungible) recorded on blockchain. A token may include metadata, descriptors, additional images and/or files, other digital media assets, smart contracts, code, scripts, and other information and data.

As referred to herein, a "non-fungible token" (NFT) is a unique digital file stored within an electronic storage database and may be enabled on a digital ledger called a blockchain. An NFT is a cryptographic token that is fully fungible, unlike cryptocurrencies such as bitcoin and many network or utility tokens, which are not mutually interchangeable, and thus not fungible. Traditional NFTs may comprise 2D or 3D images, photographs, artwork, animation, or other non-tangible assets that are procedurally or generatively created. An NFT may be enabled as a virtual goods object that is linked to a physical object in the real-world, with or without a smart contract.

An NFT may be created by uploading a file, such as an artwork, to an NFT auction market. This creates a copy of the file, which is recorded as an NFT on the digital ledger. The NFT can then be bought with cryptocurrency and resold through the use of a smart contract. NFTs are used to commodify digital items, such as in non-limiting examples, digital art, video game items, or music. In some instances, the NFT token includes a reference to an asset, such as an image file, that may be stored elsewhere and generally referenced with a URL. In instances where data security and asset immutability are required or desired, the asset may be stored in blockchain, but still referenced.

As referred to herein, a "smart contract" is a self-executing contract with the terms of the agreement between buyer and seller being directly written into lines of code. The code and the agreements contained therein exist across a distributed, decentralized blockchain network. The code controls the execution, and transactions are trackable and irreversible. Smart contracts permit trusted transactions and agreements to be carried out among disparate, anonymous parties without the need for validation by a trusted third party such as a central authority, legal system, or external enforcement mechanism.

As referenced herein, a virtual goods object consists of three core elements. A virtual goods object first must be a physical object, second be associated with a digital media asset, and third must have a database entry on a digital ledger, cryptographic entry, or a token on a blockchain ledger. The token on a blockchain may include metadata, one or more smart contracts, code, scripts, or any other type of data entry within the blockchain. Each of the physical object, digital media asset, and database entry on a ledger of any type may be mutually representative of the other, and owning any one element of the three core elements may be equivalent to owning the other two core elements.

In an embodiment, a user owns a Virtual Goods Object (VGO), which includes the physical object, digital media asset, and a token (representative of the database entry in a ledger). If one of the three core elements is traded or sold to another user, the other two core elements are likewise transferred to the same other user in the same transaction.

In a non-limiting example of the exchange of a VGO, a sneaker virtual goods object may be comprised of a physical pair of sneakers as the first core element, a digital media asset such as a 3D object of a pair of sneakers that may be worn on an avatar or experienced in a virtual environment, such as an augmented reality space or a virtual reality environment, or a 2D object such as an image, photo, illustration, or other media representation, and a Token stored in a database or a cryptographic entry in a blockchain ledger. The owner may trade the physical sneakers to another user, and transfer the digital media asset along with the token. Alternatively, the owner may trade or transfer the digital media asset (such as a 3D pair of sneakers in a virtual world or game environment) to another user, which then transfers ownership of the Token. The new user that received the transfer now has ownership rights to the physical pair of sneakers. Further, the trade, transfer, or sale of the Token through an exchange, marketplace, crypto-exchange, or wallet to wallet transfer, also causes ownership of the physical sneakers and the digital media asset to change as well.

In another non-limiting example, the VGO is comprised of a physical pair of sneakers, a digital media asset (such as a 2D image or 3D object) of a pair of sneakers, and a Token stored in a database or a cryptographic entry on blockchain (such as a NFT or Non-Fungible Token). Acquisition of the Token grants the owner rights to a physical pair of sneakers, or is exchangeable for, or redeemable for said pair of sneakers, a special offer, or a discount to purchase, etc. Further, a user could purchase a pair of physical sneakers and acquire rights to claim the Token and digital media asset linked to, associated with, or representative of the physical shoes.

An additional element of a virtual goods object may include a unique identifier, which includes but is not limited to a unique identification number, serial number, alphanumeric string, symbol, marker, image, hexadecimal, hash, code, or pattern represented, displayed, or accessed via barcode, a QR Code, an NFC device (chip or tag, etc.), a label, an RFID device (chip or tag, etc.), magnetic strip, sensor, or other method. This unique identifier is associated with the physical object and is recorded in one or more databases, ledgers, tokens, or cryptographic Token on blockchain as part of the Virtual Goods Object.

In the example above, the physical pair of sneakers may have a barcode, NFC chip, RFID tag, label with a serial number, or may be accompanied by a certificate, coupon, proof of purchase, etc. with a unique identifier to that specific pair of physical sneakers that can be used to create, claim, or acquire the corresponding token and digital media asset (such as a 3D pair of sneakers, digital collectible, NFT, etc.).

In a representative operating embodiment, a computing device, such as a mobile device, is connectable (for example, via WAP) to a transmission functionality that varies depending on implementation. Thus, for example, where the operating environment is a wide area wireless network (such as a 3G, 4G, or 5G network), the transmission functionality comprises one or more components such as a mobile switching center (MSC), which may comprise an enhanced ISDN switch that is responsible for call handling of mobile subscribers, a visitor location register (VLR) which may be comprised of an intelligent database that stores on a temporary basis data required to handle calls set up or received by mobile devices registered with the VLR, a home location register (HLR), comprising an intelligent database responsible for management of each subscriber's records, one or more base stations that may provide radio coverage with a cell, a base station controller (BSC) comprising a switch that acts as a local concentrator of traffic and provides local switching to effect handover between base stations, and a packet control unit (PCU) which may be a device that separates data traffic coming from a mobile device.

In an embodiment, the present innovation associates a virtual goods object (VGO), experienced in 2D or 3D, with a real-world object, asset, item, or offer in such a manner that the VGO can be redeemed, exchanged, converted, or grant rights, privileges, or access for or to the real-world item upon the transference of the VGO from one virtual space or site to another virtual space or site. In essence, owning the VGO, is the same as owning the real-world item, or having the rights to acquire, purchase, manufacture, print, 3D print, or fabricate it even though the transference of ownership takes place as the transferal of the VGO from one entity to another entity in a virtual transaction.

In accordance with embodiments of the present disclosure, creation of virtual objects and virtual goods may be done manually or automatically, depending on the implementation of the technology. These include, but are not limited to:

Using a software application or web interface to create a virtual goods object, upload 2D images, textures, or materials or 3D objects with textures or materials, define its properties, link it to real-world items or offers, and then publish or activate it, making it available to users that meet one or more requirements or conduct any kind of activity; and Programmatically, with a computing device or server application or script that creates virtual objects with varying properties, behaviors, 2D or 3D objects, animations, and textures.

These virtual objects and virtual goods can be distributed manually, such as determining the location of where or how the object(s) can be discovered and found; distributed automatically through a system that either randomly determines its location and accessibility; or in a way that follows a methodology or set of conditions that determine when and where the objects are published or activated.

Virtual Goods Objects and those enabled as virtual goods may be located in real-world locations; placed in 2D and 3D games; distributed in 3D environments, virtual worlds, or virtual reality experiences; or associated with an image or object in the real world (e.g., a picture, poster, logo, symbol, icon, sign, graphic, Eiffel Tower, etc.), or acquired directly through an exchange, marketplace, shop. In addition, each of these locations, objects, or images can have one or more virtual objects or virtual goods associated with them.

Virtual Goods Objects, Digital Media Assets, Tokens (including fungible, non-fungible, and semi-fungible) may also created, enabled, sold, traded, transferred, listed for sale or auction, etc. through a website, mobile application, desktop application, web application, marketplace, exchange. They may also be sold in physical stores, in similar fashion to a gift card that unlocks or can be redeemed for the Virtual Goods Object, which may then be used to claim, exchange, convert, or redeem for the associated physical object.

This document illustrates a methodology for creating a VGO, linking it to the real-world item, creating a mechanism for redeeming the VGO for the real-world item, and interacting with the VGO, generally in Augmented Reality (AR), Virtual Reality (VR), in a game or 3D virtual world (VW), or some other manner, such as a web browser, extension, plugin, that is enabled to display and/or interact with 2D or 3D objects. Such interaction may be enabled in a web browser through an implementation in HTML, Javascript, VRML, Web3D, OpenGL, WebVR, A-Frame, or the like. In a non-limiting example, the VGO is linked to or associated with a credit, voucher, or offer, that is the mechanism for redemption, exchange, or conversion with a promo code, QR code, bar code, receipt, ticket stub, proof of purchase, or similar identifier that would be used at a point-of-sale register or online in a web shopping cart, marketplace, or exchange.

In an embodiment, a VGO, is linked to, associated with, and/or representative of a real-world asset. Owning the virtual goods object is the same as owning the real-world asset. Note that the virtual goods object may be a 2D or 3D object but may also be some other type of digital media object experienced in technologies such as, by way of non-limiting example, Augmented Reality, Virtual Reality, virtual world, computer application, internet browser, shop, marketplace, exchange, or digital wallet. Such alternative digital media objects could be expressed as or appear as an image, and audio track or snippet, a multimedia representation, a text object, or additional forms of virtual representation that may be created.

In an embodiment, a VGO may be an object, such as, in a non-limiting example a 2D or 3D object or other virtual representation, as previously described, experienced and accessible in a 2D or 3D environment that is linked to a real-world asset, item, product, object, service, or offer. As used herein, the terms asset, item, product, object, service, or offer are interchangeable.

In an embodiment, a VGO can be linked to, associated with, or representative of a credit, offer, voucher, ticket, or something similar that is used as a method of transaction or proof of purchase with a third party to take ownership of a real-world asset through a transaction of transferring the VGO that is linked with the real-world asset. By way of non-limiting example, just as a pair of sneakers in the real world may be exchanged or purchased from a merchant in a real store, a 2D or 3D VGO of a pair of sneakers may be exchanged or redeemed with a merchant in a virtual marketplace for a pair of physical real-world sneakers where the VGO is linked to the pair of real sneakers and transfers title or rights to acquire, purchase, manufacture, print, 3D print, or fabricate in the virtual transaction. Similarly, a 2D or 3D VGO could be exchanged, redeemed, converted, or grant rights, privileges, or access to a physical real-world asset, status or membership (such as a higher tier of a frequent flier program, backstage access, VIP designation or areas), or access to an event (such as a movie, concert, performance, sporting event), or early or preferred access or admission to an event, show, sale, auction, venue, experience, or other experiential location.

In an embodiment, a VGO can be a special offer. Instead of exchanging such VGO for a real-world asset, the Special-offer VGO is effectively like a coupon such as "buy one, get one free" or "buy one at 20% off". Such special offers may be transferred from one user to another user in a virtual environment where the acquiring user retains the same rights and title to the special offer as the user that originally owned the special offer VGO.

In an embodiment, ownership of a virtual goods object experienced in a 2D or 3D environment is equal to ownership of the associated real-world asset, the virtual goods object in a 2D or 3D environment can be exchanged or redeemed for a real-world asset using mechanisms such as, but not limited to, a linked or associated credit, voucher, and/or agreement, and the virtual goods object in a 2D or 3D environment can be linked to or associated with an offer, such as a coupon, giving the owner the right to purchase, acquire, manufacture, print, 3D print, or fabricate an asset with predefined terms.

In an embodiment, in which the VGO is linked directly to a real-world object, or indirectly through the use of a credit, voucher, or offer, to be exchanged, redeemed, or converted for the real-world object, the virtual goods object can be tokenized and considered a Non-Fungible Token (NFT) which may then be stored within a blockchain. In this case, ownership of the NFT token grants ownership of the virtual goods object. The NFT is associated or linked to the virtual goods object, much in the same way that the virtual goods object is associated or linked to a real-world item, object, or asset.

In an embodiment, the VGO may be linked to, associated with, or representative of a smart contract. In such embodiment ownership of the VGO is the same as being a party in a smart contract where a second party, wishing to acquire the good or service represented by the VGO, has agreed to a relationship or a transaction with the first party, who wishes to transfer said good or service represented by the VGO, with pre-determined terms and conditions.

By way of non-limiting example related to real-estate, a seller could create a virtual goods object through a proprietary digital platform along with an associated offer to sell a house, land, or other real property to anyone that has acquired the VGO for a specific price with terms and conditions. The seller may offer to meet its own terms and conditions while making certain representations regarding the real property, such as, by way of non-limiting example, representation related to the deed, title, property taxes, and/or inspection.

By way of non-limiting example related to transfer of other rights in personal or real property, the same procedure described above could be followed for the sale of a boat, car, gemstone, artwork, art, clothing, luxury good, sports collectible, rental property, or any other good in its entirety or in fractional share or ownership.

In a non-limiting example of implementation, a user could open a browser, go to earth.omniscape.com which features a 2D or 3D map (such as, by way of non-limiting example, openstreetmap, google maps, google earth, and/or mapbox) which may also have some 3D aspects to it (zoom, tilt, pan, etc. not just top down 2D), that could show a property with a 3D building on it. In this example, the 3D building is a virtual goods object that the user can collect and take ownership of, or purchase to take ownership of. Such collection or purchase grants the user rights to the actual property, or rights to purchase the property from the seller based on the terms of the associated offer or smart contract. Similarly, the building may be represented or visualized on the map as an icon, logo, marker, image, or symbol, in 2D or 3D, and may or may not itself be a tokenized object recorded or referenced on blockchain.

In an embodiment, upon acquiring the VGO, the user could redeem or activate it, thereby triggering activity on the server hosting or otherwise associated with the VGO. This activity would prompt the user for certain details. By way of non-limiting example, the prompt could request the user's name or other identifying indicia if not already stored in the system under the user profile. The user could then file the proper legal documentation with the appropriate legal and governmental parties, thus effectively automating the transfer of the property to the VGO owner.

In an embodiment, owning the VGO gives the user the right to purchase the item or property at a later date for the price and terms defined as part of the VGO. In such embodiment the transaction may have an expiration date on it, whereby the user must buy the property at the defined terms and conditions, on or before a certain date, or the object/offer expires.

In each embodiment herein described, the VGO may be transferable to another party, and along with it the same rights, terms, and conditions.

In an embodiment, the user may acquire all or partial ownership to real property or asset-like personal property, such as, by way of non-limiting example, a car or boat. The user may acquire rights to some or all of revenue, such as, in non-limiting examples, lease or rental income, generated by physical property, real-estate, and/or buildings. The user may acquire the right to purchase real or personal property, or a subset of rights in real or personal property, for specified terms or may acquire usage privileges and rights to the aforementioned property, such as the non-limiting examples of a hotel room reservation, car rental, or block of time for a time-share vacation home. In each embodiment described, all rights acquisition described herein may be accomplished by transfer of ownership of a virtual goods object, VGO. The VGO may be a 2D or 3D object or other digital media type, and may be represented as a 2D or 3D object such as an image, animation, graphic, icon, logo, marker, symbol, 3D object, building, 3D car, or selection of an area of a 2D or 3D map or 2D or 3D landscape. The VGO may or may not be linked to an NFT/Smart Contract to automate and effect the transfer of the desired right upon satisfaction of the terms of the smart contract. In any embodiment described herein, a user may acquire or transfer any one or more of a bundle of rights associated with a 2D or 3D object, such rights including but not limited to fee simple or a lesser estate, rental or mortgage rights, usage, easement, covenant rights, as well as content publishing or advertising rights at said location In an embodiment, a VGO may be defined by a user's selecting an area on a 2D or 3D map or 2D or 3D landscape. In such embodiment the VGO is still a 2D or 3D digital representation, but instead of a discrete object, such as a single coffee cup or car, that consists of one or more images or polygons and textures, the map/landscape is an area or selection on a map in 2D or 3D or of polygons and textures that are part of a larger polygonal mesh or other digital representation, such as a 3D landscape. In such an embodiment, a resulting landscape VGO may be broadened to include a 2D or 3D object. The 2D or 3D object may be linked to or associated with any number of examples of commercial paper and/or indices of ownership including but not limited to credits, vouchers, smart contracts, titles, and deeds.

In an embodiment, a user may explore a map or 2D or 3D landscape in a 2D or 3D environment utilizing a 3D viewer or computer browser, and the user may select a pre-defined area or lot on the map of 2D or 3D landscape. The pre-defined area or lot is a digital representation capable of being purchased by the user. This pre-defined area or lot corresponds to a real-world physical location. When the user purchases the digital representation according to the embodiments herein described, the user takes a bundle of property rights held in common with the digital representation and the real-world physical location. As herein delineated, this bundle of rights may be evidenced by automatic transfer of title and/or deed, and may include rights including but not limited to rights to lease/rental income from the property and facilities upon it, rights to purchase or sell the real-world property under specified terms, or privileges and rights to use the identified property or facility or rights to create or publish content or rights for advertising.

Acquiring/trading/exchanging the digital object itself confers ownership of the token AND the physical object. Similarly acquiring/trading/exchanging the token confers ownership of the digital object and the physical object, and finally, acquiring/trading/exchanging the physical object confers ownership of the digital object and the token.

In an embodiment, the user may select, purchase, and acquire a 2D or 3D object within any two or three-dimensional facsimile including, but not limited to, AR, VR, Virtual World, and 2D or 3D map view. Such selection, purchase, and acquisition confers upon the user any one or more of the property rights within a recognized bundle of said rights.

In a non-limiting example, a user creates a 3D object in a game and link it to a physical pair of sneakers. Ownership (or redeem/exchange, etc.) of the physical sneakers can be acquired by gaining possession of the 3D object (and vice versa). In this case, the 3D object is associated with, linked to, representative of, the physical speakers. Alternatively, the user may create a token (i.e. NFT) of the physical asset (sneaker), which may point to or include one or more images of the sneaker, but is also represented with a digital asset (such as a 2D image or 3D object). The 2D image may be viewed as an image or thumbnail on a website (such as in a marketplace) or in a crypto wallet, or in a game or virtual world inventory (such as in a player inventory in a game or website). Similarly, the physical asset and the digital token can be represented by a 3D object (such as a 3D pair of sneakers on an avatar in a virtual world space or a 3D coffee cup in augmented reality).

In another non-limiting example, In another example a User may buy a physical item that comes with, is bundled with, or that can be claimed a digital media asset (such as a photo, generative art, 3D object, etc.), which may be tokenized (as an NFT or some other recording in a database, ledger, cryptographic asset, etc.). Conversely, the user may acquire a digital media asset (as above, and which may be a fungible or non-fungible token) that comes with, is bundled with, or that can be claimed as associated with a physical object. In this non-limiting example, a user may buy a piece of artwork that comes with a NFT of the same artwork in digital media form, or some other digital media asset). Upon buying the physical artwork, the user receives or can claim the corresponding digital media asset. Alternatively, a user may buy a digital media asset that is tokenized (entry in database, ledger, cryptographic asset, etc.) that comes with, is bundled with, or that can be claimed the physical piece of the artwork. There may be multiple digital media assets that are tokenized (recorded in database, ledger, cryptographic asset, etc.) that comes with, is bundled with, or that can be claimed a fractional piece or element or rights to the entirety or any portion of the physical object.

In a non-limiting example, a user may acquire a physical asset and utilize the connection with its digital goods counterpart. In this example, a user may purchase or otherwise acquire a physical object, such as from a store, an online store or marketplace, a trade, transfer, sale, promotion, auction, event, or other means of acquiring the physical object. The physical object may have a code, tag, NFC, RFID, QR code, etc. included with or attached to the physical item, or otherwise marks, designates, and/or identifies the item with some type of unique identifier. In this example, the user may open a website or application (mobile, web, desktop, etc.) to register and enter this code or other unique identifier which may unlocks or assigns the digital media asset to a user account and/or inventory, while updating the related token entry (database, ledger, cryptographic ledger, blockchain, etc.) or creating a new entry for the digital asset. The code entry may be manually entered such as with a keyboard or keypad, it may be scanned with a camera, it may be scanned and read by a device (such as a smartphone, RFID reader, etc.), or may be imported to the user experience through a digital entry transfer through electronic communication across a network.

In an alternative non-limiting example, a point-of-sale merchant, during or after the purchase, may scan or otherwise read or acquire the unique identifier from the physical object (for example, scanning a barcode or scanning of an NFC/RFID chip) and then either scanning another code, barcode, QR code, machine ID, etc. that may be displayed on device associated with the user as a way to validate the transaction and claim the digital media asset. Alternatively, the user may provide an account username, an email address, a phone number, a cryptographic wallet address, or some other identifier that the point-of-sale merchant will enter into their system instead of scanning the barcode, code, tag, chip, machine ID, or other unique identifier.

A user may also acquire a digital goods asset that permits the claim of a physical asset that is associated with the digital VGO. In this process a user may purchase or otherwise acquire a digital VGO, which may include but is not limited to a 3D object in a game or virtual world, a 2D or 3D Non-Fungible Token (NFT), a reward in a loot box or crate in a game, reward in loyalty program, check-in at a location or event, promotion, purchased from an online marketplace or exchange, gifted from or traded with another user, discovered and collected in an augmented reality or virtual reality application, virtual world, or simulation. The user may access, open or otherwise select or interacts with the digital media asset or token representing the asset.

Upon receipt or transfer of ownership of the Digital Media Asset or Token, a smart contract, program, script, application, etc. automatically or upon meeting specified conditions, transfers rights or access to the physical object, which may include reserving the physical object for collection, mailing or shipping, certification, or filing a title or change of ownership with a third party or organization.

In a non-limiting example of this process, a user may open or access an application (such as a mobile application, web application, website, desktop application, game, marketplace, exchange, wallet, cryptocurrency wallet, etc.), or account, access account inventory, selects the Digital Media Asset or Token, selects an option to claim, convert, exchange, redeem, or activate, which then either triggers a script, code, program, smart contract, etc. to claim, collect, or transfer ownership of the physical object. Or alternatively, may display a code or image (such as a barcode, QR Code, or other item) that can be scanned by a device or input into a register, computer, website, application, etc. or enables the mobile smartphone's camera to scan a vendor or third-party code or image or other In an embodiment, rights transfers effected through VGO selection, purchase, acquisition, alienation or other re-characterization can incorporate crypto-currency tokens and blockchain techniques. One exemplary cryptocurrency, the non-fungible token (NFT), is generally stored in a crypto wallet and is evidenced by an immutable ledger entry that is a reference link to something else. This something else can be any number of items including but not limited to a digital photo or image or a real-world physical piece of artwork. Some NFTs are established as tokens with a reference to something else which may be an intangible property, such as, by way of non-limiting example, an image or video clip, while others confer ownership in a tangible property. In a non-limiting example, owning a NFT token is the same as owning the image or artwork associated with the NFT. In addition, owning a token may allow the user to gain whole, partial or fractional control/ownership in much the same manner as owning stock in a company or part of a time-share beach condo, or gain voting rights, such as buying tokens associated with ownership or voting control in a company or other endeavor.

As commonly defined, NFTs may be acquired through an NFT marketplace, where a user creates the NFT token and associates it with the referenced item as represented by a photo or image of the referenced item. NFTs are sold through the marketplaces, and may be transferred or sold to another user, in a direct blockchain wallet to wallet transfer or listing on a NFT marketplace.

In an embodiment, a real-world asset, item, or object may be tokenized as an NFT and the NFT can be linked to or associated with a 2D or 3D object. Acquiring ownership of a virtual goods object in a 2D or 3D environment can be used to gain, claim, or acquire ownership of the item referenced in the NFT in the real world. While discovering and acquiring a virtual goods object may generally be done in a 3D environment or world, in an embodiment the virtual goods object may be acquired in other ways including, but not limited to, buying it from a marketplace listing, or receiving it in trade or sale from another user, with the 2D or 3D objected represented or visualized as a 2D or 3D object, image, or other graphical representation, which may or may not bear brand marks, logos, slogans, or other identifiers. The VGO may be stored in a user's inventory, wallet, or cart, and may be listed, represented, or visualized as a 2D or 3D object, image, icon, marker, thumbnail, symbol, or other digital media, which may or may not bear brand marks, logos, slogans, or other identifiers. While in an embodiment any interactions with the VGO may generally occur in a 3D environment, space, application, viewer, or world, the VGO may be taken out of that 2D or 3D environment to store, transfer, trade, and/or sell. In an embodiment, such removal of the VGO from the 2D or 3D environment may be done by the VGO being put into one or more of an electronic inventory, ledger, wallet, storage, listing, exchange, marketplace, and/or cart.

In an embodiment where a VGO is linked to, associated with, representative of, convertible to, or redeemable or exchangeable for a real-world item, object, product, asset, coupon, offer, or contract, a user can buy an NFT and gain the VGO and its associated real-world item, or a user can collect the VGO and as a result gain ownership of the corresponding NFT token. This embodiment enables bi-directional acquisition, wherein not only does acquiring a NFT token confer ownership of a VGO, but acquiring a VGO confers ownership of the corresponding NFT Token.

In an embodiment, a user may go to a marketplace and buy a NFT that is linked to a 2D or 3D object which is a VGO. When the user acquires the NFT, the virtual goods object is then associated with the user's account and the user's inventory in a 3D world, environment, wallet, or game of the user's choice. Alternatively, the VGO may carry terms pre-determined by the terms and property of the NFT token.

If in an embodiment a user acquires a VGO object, then the AR, or VR management system or other management system may update the properties of the NFT token, transfers/assigns ownership, and records the transaction on blockchain. By way of non-limiting example, the user may discover and collect a 2D or 3D VGO in AR, VR, browser, application, or VW, buy it from an online store or marketplace, receive it in a trade/buy/sell transaction with another user, or redeem a promo code, offer, credit, or voucher to acquire the rights to the VGO or NFT. The client application of the present innovation then notifies a system server that the user has acquired the object, at which time the server then updates the file or blockchain record of the corresponding NFT's properties and designates the user as the owner of the NFT.

In an embodiment, a user may acquire a real-world object, asset, item, and/or product and then confer ownership of a related virtual goods object and/or related NFT. By way of non-limiting example, a user may go to a physical store and buy a pair of tangible sneakers. As part of the purchase, the user may be given a promo code, QR code, NFID code, barcode, or indicia of some other transaction identification method, that the user can redeem and/or exchange through a platform, or a marketplace, to acquire an associated VGO, and/or an NFT. Similarly, the user may use a receipt, proof of purchase, check-in, scan, or other item or activity, to redeem, exchange, or convert to acquire the associated VGO and/or NFT.

In an embodiment, any form of cryptocurrency may be stored in a crypto wallet. Non-fungible tokens may also be stored in crypto wallets, while the item or asset that it is linked to or associated with generally resides elsewhere. In a non-limiting example, NFTs may be stored on a blockchain in its own entry, or off-chain, such as on an image server or website.

A 3D object is, literally, a 3D object comprised of polygons, vertices, materials, and textures, and may include other properties such as, but not limited to animations, behaviors, and interactivity. The 3D object is saved as a file, generally in one of many formats including but not limited to, .obj, .fbx, .c4d, .stl, and .gltf. The particular file format defines the parameters of the 3D object. Virtual Reality Markup Language (VRML) is a 3D interchange format which defines most of the commonly used semantics found in 3D applications such as but not limited to hierarchical transformations, light sources, viewpoints, geometry, animation, fog, material properties, and texture mapping.

A NFT is basically a script and meta data, and a 3D object is the same. A program defines the properties of a 3D object, and then another script with metadata creates instances of that 3D object in a 3D world or environment. In an embodiment, the instant innovation expands the scope of a 3D file format to include additional functions and meta data, thereby creating a 3D object that is a NFT token, and storable in a crypto wallet. Conversely, in an embodiment in which the NFT is a 3D object, and may be visually represented as a 2D or 3D object in non-3D environments, the NFT can be loaded and viewed in a 3D environment, browser, or other environment. In such an embodiment a crypto wallet, as expressed as a 3D wallet, can store 3D objects that are NFTs, as opposed to a NFT token that is linked to, associated with, or representative of a 3D object, and a NFT can be transferred and loaded/viewed in a 3D environment.

In an embodiment, everything in a game or 3D world, such as, by way of non-limiting example, items, clothing, and weapons, is a NFT object in and of itself instead of just being referenced by a NFT located outside of the game stored in a crypto wallet. In this embodiment the user inventory itself is a new kind of crypto wallet/storage. Each of these objects can still be virtual goods objects linked to, associated with, representative of, or exchangeable/redeemable for something in the real-world.

In an embodiment, NFT transfer may be instantiated through Online or Web redemption and is a method of redemption, conversion, exchange, or transference of ownership of a real-world item/product. The online redemption method includes the user adding a product to the user's cart, and then entering in a code during checkout that applies a price change such as a discount. In an embodiment, the user may collect or otherwise acquire a VGO, begin a redemption process, and may immediately be linked to a merchant's website to the product listing or directly to a cart for checkout with the real-world item automatically added.

In an embodiment, the instant innovation provides for a methodology for triggering content, which may be 2D, such as, by way of non-limiting example, a poll, URL, video clip, or 3D, such as, by way of non-limiting example, a virtual goods object, which directly offers the ability to acquire a virtual goods object or offers a link to a web store product listing. In an embodiment, the instant innovation may allow for triggering the creation and/or display of a 3D virtual goods object from a QR code, barcode, image, video, or audio source as previously associated on the server, application, and/or browser, where the VGO can then be redeemed in-person at a point of sale, or online. Using GPS for AR, or placement in a 3D environment, such as but not limited to a 3D world, scene, and/or game, is one method of discovering and acquiring a 3D VGO. The instant innovation allows for other triggers, such as, by way of non-limiting example, image recognition of a particular machine-readable code or image.

In an embodiment, triggered content may be differently customized based on a user's profile, activities, preferences, and/or demographics. By way of non-limiting example, two different people watching the same video or scanning the same QR code, bar code, or other code, may see completely different 2D or 3D VGOs created for each person to independently interact with or acquire.

A token may be modified, updated, or appended with new information upon a transaction, trade, redemption, exchange, etc. In such cases, the token is changed to record the transaction and new owner, or any other data or metadata that is relevant to the Token, the Physical Object, or the Digital Media Asset.

In some cases the token may be destroyed (or "burned") when the physical object has been claimed or the token has otherwise been activated, used, etc. The Digital Media Asset may likewise be destroyed or it may remain as an owned digital media asset, but without the ability to further redeem, convert, exchange, etc.

In a non-limiting example, a user has acquired a Virtual Goods Object of a 3D Coffee Cup which may be redeemed for a real coffee at a café. Upon claiming and validation, the user receives the free coffee, and the 3D Coffee Cup is either destroyed and erased, or it is marked as used (or redeemed, etc.) and converts into just a 3D object with no further linking to physical object. In a variation, it may have "charges" or "uses" where it may be exchanged, redeemed, activated, or claimed, etc. more than one time, generally with a pre-determined limit or maximum.

The presently disclosed subject matter is now described in more detail. For example, FIG. 1 illustrates a view of a person 100 holding a smartphone 102 for viewing a virtual object 104 within a digital environment and for use in acquiring an item associated with the virtual object 104 in accordance with embodiments of the present disclosure. Referring to FIG. 1, the virtual object 104 can be viewed by the person 100 when displayed by a display 106 of the smartphone 102 in accordance with a suitable augmented reality technique. For example, the smartphone 102 may be configured to capture an image or video of a table 108 in the real world and to recognize a top surface 110 of the table 108. The smartphone 102 may subsequently overlay an image of the virtual object 104 on the captured image or video such that it appears that the virtual object 104 is placed on the surface 110. In this example, the virtual object 104 is a virtual coffee cup but may alternatively be any other type of virtual object. The virtual object 104 may be a visual representation of the item.

In operation in accordance with embodiments of the present disclosure, the smartphone 102 may receive a coordinate for placement of the virtual object 104 in the digital environment shown in FIG. 1. For example, a server may communicate the coordinate to the smartphone 102 via a cellular connection, WI-FI® wireless connection, and/or other suitable wireless connection. The smartphone 102 may also receive information about display of the virtual object 104. The smartphone 102 may be configured to control the display 102 to display the virtual object 104 when a position corresponding to the received coordinate is within a field of view of a camera of the smartphone 102.

Continuing the example, the smartphone 102 may also be configured to receive an input via a user interface of the smartphone 102 for selecting the displayed virtual object 104. For example, the person 100 may touch the display screen 106 where the virtual object 104 is displayed for selecting the virtual object 104. The smartphone 102 may subsequently associate with the person 100 or user of the smartphone 102 a credit for transaction or transfer in response to receipt of the input. For example, the credit may be used for acquisition of an item associated with the virtual object. For example, the smartphone 102 may store account information of the user for a coffee shop. The person 100 may apply the credit for a free or discounted coffee at the coffee shop by suitable presentation of the credit at the coffee shop.

In another example, the credit acquired by a user at one computing device may be transferred to another user at another computing device. For example, the user of one computing device may use an application (or "app") to identify the other user and to order the transfer of the acquired credit to the other computing device. The user at the other computing device may upon receipt of the credit, use the credit for obtaining an item, such as the aforementioned free or discounted coffee.

In another example, the credit may be used for a transaction other than for acquiring an item. For instance, the credit may be used for providing to the user access to content (e.g., a video, images, or music), access to an event (e.g., a movie or concert), or the like.

Figure 2:
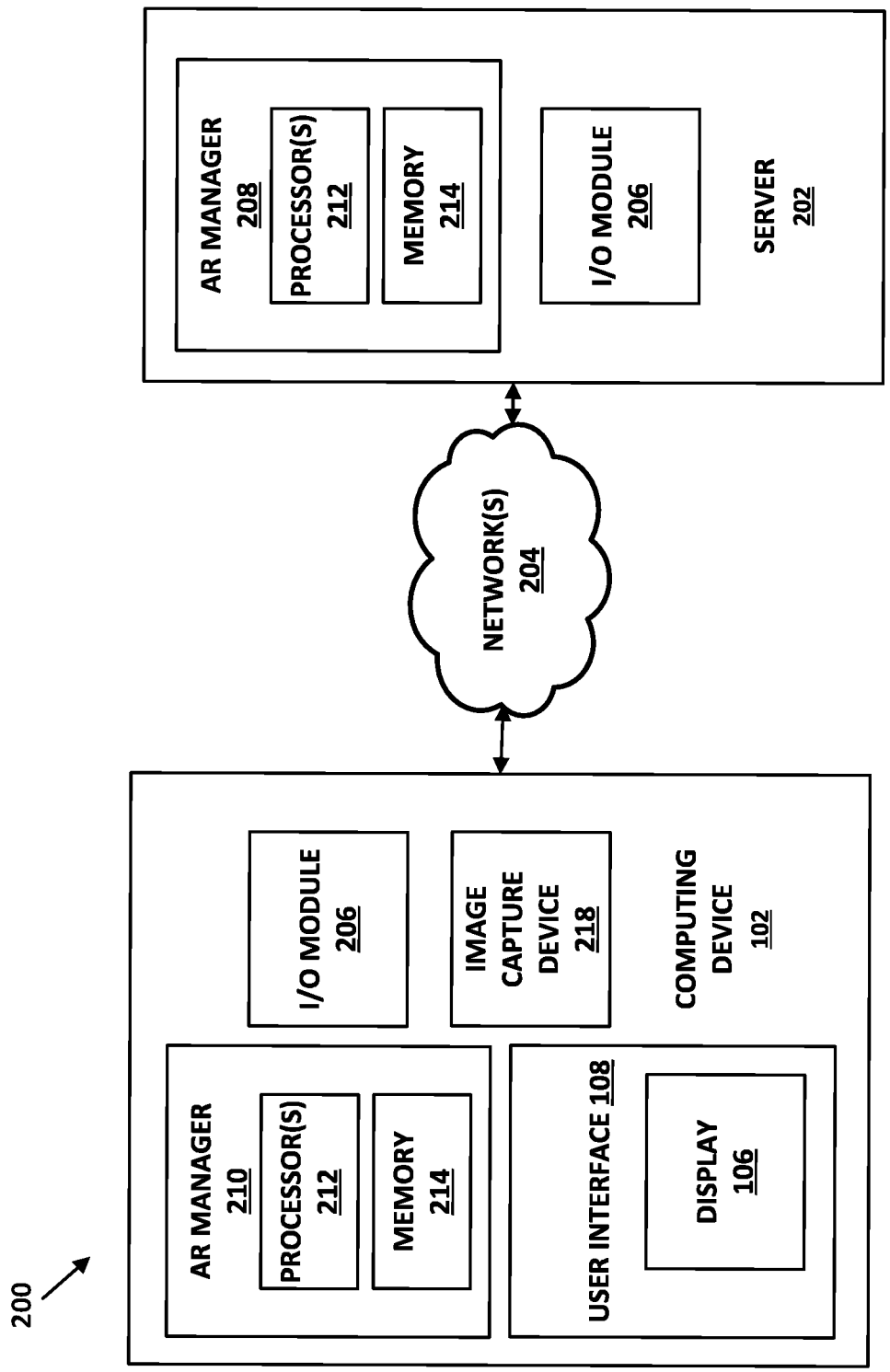
FIG. 2 is a block diagram of an example system for item acquisition by selection of a virtual object placed in a digital environment in accordance with embodiments of the present disclosure.

FIG. 2 is a block diagram of an example system 200 for item acquisition by selection of a virtual object placed in a digital environment in accordance with embodiments of the present disclosure. Referring to FIG. 2, the system 200 includes a server 202, which may be any type of computing device capable of communicating via one or more networks 204 (e.g., the Internet, wired networks, wireless networks, and the like). Particularly, the server 202 includes an input/output (I/O) module 206 or any other suitable communication interface configured to communicate with the network 204 and any devices communicatively connected thereto. The server 202 includes a number of functional components. This representation of the server 202 is meant to be for convenience of illustration and description, and it should not be taken to limit the scope of the present disclosure as one or more functions may be combined. Typically, these components are implemented in software (as a set of process-executable computer instructions, associated data structures, and the like). One or more of the functions may be combined or otherwise implemented in any suitable manner (e.g., in hardware, in firmware, in combined hardware and software, or the like). The server 202 is Internet-accessible and can interact with other computing devices via known Internet protocols such as HTTP, HTTPS, and the like. The server 202 is shown as a single device but this is not a requirement; one or more programs, processes, or other code may comprise the server and be executed on one or more servers and/or other machines in one or more networked locations.

The server 202 includes an augmented reality (AR) manager 208 configured to implement functionality for providing an AR environment for users of computing device, such as computing device 102. For example, the AR manager 208 may store coordinates for placement of one or more virtual objects in a digital environment. The I/O module 206 of the server 202 may communicate the coordinate for a virtual object to the computing device 102. The I/O module 206 of the computing device 102 may receive the coordinate of the virtual object. Also, the AR manager 208 may store information about how to graphically represent the virtual object. The information about how to graphically represent the virtual object may be communicated to the computing device 102. The coordinate and graphics information may be received by an AR manager 210 of the computing device 102.

The AR manager 210 of the computing device 102 may be implemented by hardware, software, firmware, or combinations thereof. In this example, the AR manager 210 of the computing device 102 is implemented by one or more processors 212 and memory 214. The AR manager 210 may determine one or more coordinates of an area or space within the field of view of an image capture device 218 of the computing device 102. Further, the AR manager 210 may compare these determined coordinate(s) to the received coordinate corresponding to the virtual object to determine if the coordinates match or nearly match. The AR manager 210 may control a display 106 of a user interface 216 to display the virtual object when a position corresponding to the received coordinate is within a field of view of the image capture device 218. The virtual object may be displayed on the display at a location corresponding to the received coordinate of the virtual object. The image capture device 218 may be a video camera or still camera configured to capture video of images within its field of view.

During display of the virtual object, the user may use the user interface 216 to select the virtual object. For example, the display 106 may be a touchscreen display, and the user may touch the place on the display's 106 surface where the virtual object is displayed for selecting the virtual object. Alternatively, the user may select the virtual object by use of the user interface 216 in any other suitable manner. The AR manager 210 may receive the input via the user interface 216 for selecting the virtual object. Subsequently, the AR manager 210 may associate with the user a credit for acquisition of an item associated with the virtual object. For example, the AR manager 210 may store a credit in memory 214 for later use and access by the user to use for transaction or transfer. Examples uses for credits include, but are not limited to, exchange for an object, a service, an offer, and the like. The credit, once received, may alternatively or additionally be stored in any other suitable memory location such as at the server or another computing device.

In accordance with embodiments, the computing device 102 may receive a unique identifier upon selection of the virtual object. The computing device 102 may use the unique identifier to conduct a transaction for acquisition of the item. For example, the AR manager 210 of the computing device 102 may send to the server 202 a notification of selection of the virtual object. The server 202 may send a unique identifier to the computing device 102 in response to receipt of the notification. The computing device 102 may use the unique identifier to purchase an item. For example, the unique identifier may be the credit that can be used by the computing device for conducting a purchase transaction for an item in exchange for the redeemable credit. The purchase transaction may be at a store or online.

In accordance with embodiments, the server 202 may maintain a database that associates multiple virtual objects or items with different coordinates. The database may be stored in a memory of the server 202 or otherwise be accessible by the server 202. The server 202 may manage the distribution of the virtual objects and their respective coordinates among computing devices via the network(s) 204. For example, the server 202 may communicate the virtual objects and their coordinates to the computing device 102. Although only computing device 102 is shown in FIG. 2, it should be understood that there may be many computing devices that receive the same virtual items and coordinates.

In accordance with embodiments, the server 202 may determine that a credit has been used for acquisition of the item associated with a virtual object or another transaction. The server 202 may subsequently update its database to remove the virtual object from the digital environment in response to determining that the credit has been used for acquisition of the item or another transaction. For example, the server 202 may receive notification that a user of the computing device 102 has used a credit to acquire an item in a purchase transaction. The server 202 may subsequently update its database to remove the virtual object and also notify or otherwise indicate to computing devices that the virtual object has been removed. As a result, the computing devices are configured to no longer display the virtual object as a result of the virtual object being removed.

In accordance with embodiments, the computing device 102 may utilize a blockchain technique for managing the virtual object and its associated data. Blockchain or blockchain database may be used in one or more configurations (e.g., private, public, single, federated cluster, sharded, or fully decentralized) to track history and changes of virtual object location, properties, ownership, and more. This may include implementations that are location specific with one or more servers acting in a federated manner providing consensus verification using multiple private or public blockchains, or other implementations with one or more regional or global blockchains. Each action, transaction, or activity related to an individual virtual object or multiple virtual objects, which include but are not limited to, generation, discovery, acquisition, sharing, trading, redemption, or change in object properties, location, ownership, or use can be recorded on one or more blockchains as well as updated in one or more databases or other storage medium, such storage medium including but not limited to one or more crypto wallets.

Figure 3:
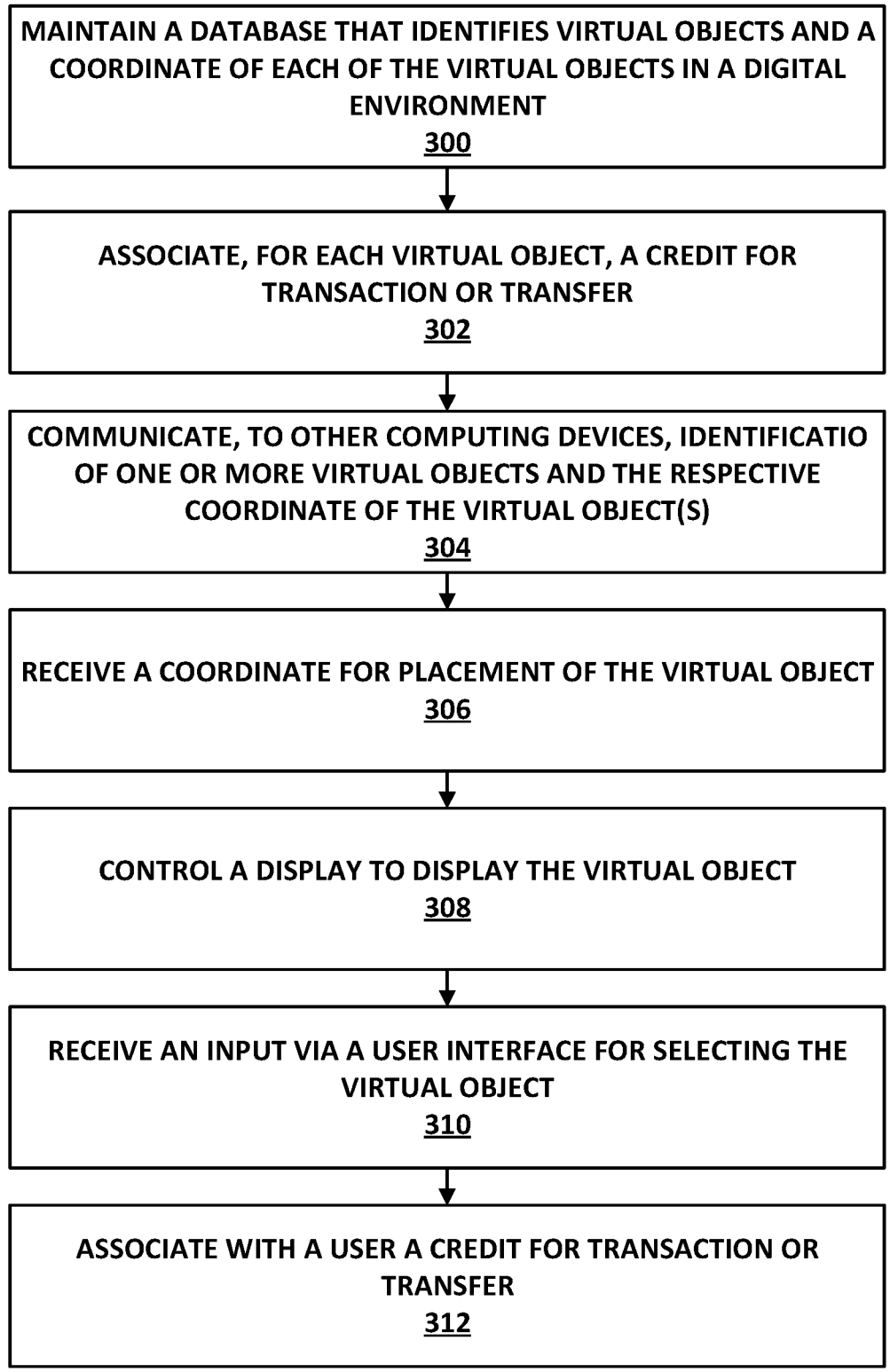
FIG. 3 is a flow chart of an example method for item acquisition by selection of a virtual object placed in a digital environment in accordance with embodiments of the present disclosure.

FIG. 3 illustrates a flow chart of an example method for item acquisition by selection of a virtual object placed in a digital environment in accordance with embodiments of the present disclosure. The method is described as being implemented by the system 200 shown in FIG. 2, but it should be understood that the method may be implemented by any suitable system. The computing devices in the system may be configured to implement an AR environment for its users.

Referring to FIG. 3, the method includes maintaining 300 a database that identifies virtual objects and a coordinate of each of the virtual objects in a digital environment. For example, the server 202 shown in FIG. 2 may maintain such a database. The database may include identification of various virtual objects and a coordinate of each virtual object in the digital environment. The database may also store information or instructions about how to display the virtual object.

The method of FIG. 3 includes associating 302, for each virtual object, a credit for acquisition of an item associated with the virtual object. Continuing the aforementioned example, the server 102 may associate, each virtual object stored in its database, a unique credit for use in acquiring an item associated with its respective virtual object or another transaction.

The method of FIG. 3 includes communicating 304, to other computing devices, identification of one or more virtual objects and the respective coordinate of the virtual object(s). Continuing the aforementioned example, the server 202 may use its I/O module 206 to communicate to the computing device 102, via the network(s) 204, identification of one or more virtual objects and the coordinate of each virtual object. The computing device 102 may receive the data via its I/O module 206 and store the data in memory 214.

The method of FIG. 3 includes receiving 306 a coordinate for placement of a virtual object in a digital environment. Continuing the aforementioned example, the computing device 102 may receive a coordinate for placement of a virtual object from the server 202. The computing device 102 may also receive information about how to visually display the virtual object. The AR manager 210 of the computing device 102 may store the coordinate and information about how to display the virtual object in memory 214.

The method of FIG. 3 includes controlling 308 a display to display the virtual object when a position corresponding to the received coordinate is within a field of view of an image capture device. Continuing the aforementioned example, the AR manager 210 can control the display 106 to display the virtual object when a position corresponding the received coordinate is within a field of view of the image capture device 218.

The method of FIG. 3 includes receiving 310 an input via a user interface for selecting the virtual object. Continuing the aforementioned example, the user may select the displayed virtual object, and the AR manager 210 may receive the input via the user interface 216 for selecting the virtual object. Subsequently, the method includes associating 312 with a user a credit for transaction or transfer in response to receipt of the input. For example, the AR manager 210 may associate with the user of the computing device 102 a credit for acquisition of an item in accordance with examples provided herein.

It is noted that a virtual object may be a 3D object or any suitable type of digital media (e.g., video, audio, banners, 2D, etc.). A virtual object may be accessible, viewable, discoverable, and/or interactive in augmented reality, virtual reality, or 3D environment or world, which may also be a virtual goods object. Virtual goods objects may be virtual objects that are linked to or representative of an object, service, offer, goods, or merchandise in the real-world, which can also be exchanged, activated, redeemed, or otherwise converted into access or ownership of the real-world object, or used as proof of rights, access, or ownership.

In accordance with embodiments, each of these virtual goods objects ("virtual goods") are unique and transferable, and different from other virtual objects that are not linked to real-world items, assets, offers, services, goods, merchandise, etc. Virtual objects may be identical in nearly all aspects, except that each is a unique instance (in the database), even though they may have identical appearances, properties, and behaviors. Each may have a unique identifier (e.g., a key ID or hash). The virtual objects may be "smart" objects in that they are unique, instead of just visual copies of the same 3D object ("dumb" instances), and their unique identifiers are part of the object. If they are transferred from one user to another, even across different platforms or applications, they may still be tracked and can be exchanged or redeemed as disclosed herein.

Figure 4:
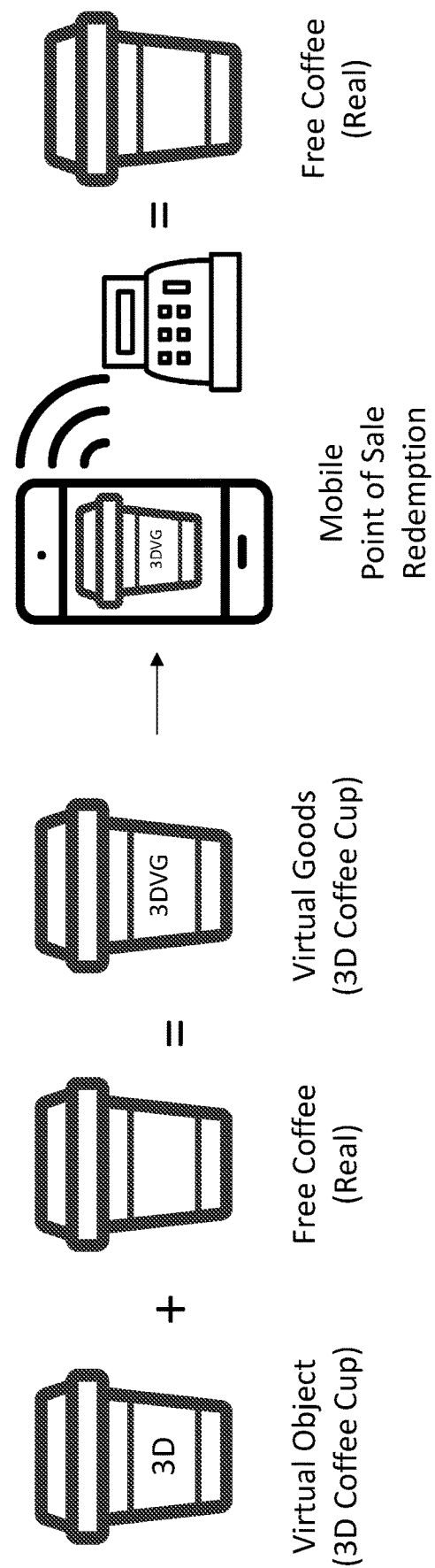
FIG. 4 is a diagram depicting steps for obtaining coffee in exchange for acquisition of a virtual object in accordance with embodiments of the present disclosure.

In a non-limiting example, FIG. 4 illustrates a diagram depicting steps for obtaining coffee in exchange for acquisition of a virtual object in accordance with embodiments of the present disclosure. Referring to FIG. 4, the figure depicts a user discovering a 3D coffee cup (virtual object) using an augmented reality application, which has been linked to a free cup of coffee, now making it a 3D virtual goods virtual object. The user collects the 3D coffee cup, goes to a local café running a promotion, and redeems the virtual goods at the point of sale in exchange for a real cup of coffee. The method of redemption may vary depending on the merchant's point of sale system, but could be based on scanning a barcode, QR code, or other method. When redeemed, the virtual goods virtual object is then removed from the user's inventory completely, or replaced with a generic 3D coffee cup that no longer has virtual goods properties associated with it.

In another non-limiting example, a sneaker object, such as a 3D model of a pair of sneakers, may be activated, redeemed, or exchanged at a retail location or online for merchandise such as a pair of real sneakers, or in exchange for a special offer such as buy one get one free, or a discount, such as redeem or exchange the 3D sneaker object in exchange for a 10% discount on your next purchase of real-world sneakers that have matching model, color, size, brand, etc.

Each virtual object can have certain data and information embedded into the data file, database entry, and/or within the metadata for the specific object identifying it as a unique object and virtual good. When the object is used, activated, is traded (change of ownership), modified, or the like, the changes are reflected in the object data file, which may include in one or more blockchains, providing a record of its current and past state/behaviors, and so forth. Unique smart virtual objects cannot be copied and can only exist in one place or location (real or virtual) at any time.

In a further non-limiting example, a user logs into an application or web interface and creates a new object instance in the database with varying properties, behaviors, 3D object, animation, textures, and the like. This may be done from scratch or based on a previously created template. The new instance is subsequently used to create one or more virtual objects that can then be linked to real world images or objects, each with a unique code or identifier used to reference the real-world object. These identifiers include but are not limited to hashIDs, alphanumeric strings, code snippets, bar codes, and/or QR codes.

Figure 5:
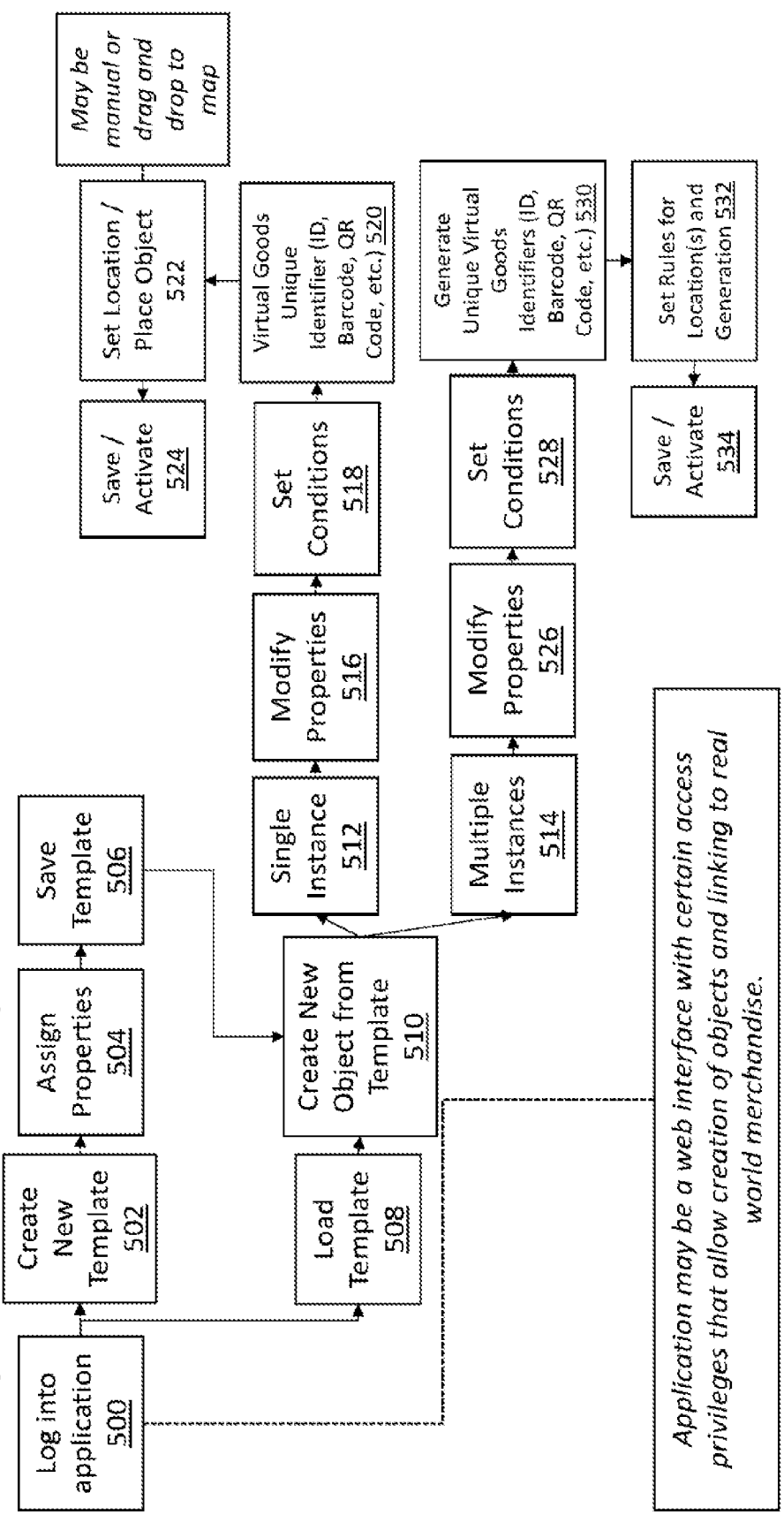
FIG. 5 is a flow diagram of an example method of virtual goods creation and distribution according to embodiments of the present disclosure.

FIG. 5 illustrates a flow diagram of an example method of virtual goods creation and distribution according to embodiments of the present disclosure. The method of FIG. 5 may be implemented by any suitable computing device, such as a server. For example, the method may be implemented by the AR manager 208 of the server 202 shown in FIG. 2.

Referring to FIG. 5, the method includes logging 500 into an application, creating 502 a new template, assign 504 properties, and saving 506 the template.

The method of FIG. 5 also includes loading 508 a template and creating 510 a new object from the template.

Subsequent to creating of an object from the template, the method of FIG. 5 may either create 512 a single instance of the object, or create 514 multiple instances of the object. Turning first to creating 512 a single instance of the object, the method may subsequently modify 516 properties and set 518 conditions. Further, a virtual good unique identifier may be provided 520. A location or place for the object may be set 522. Subsequently, these setting for the object may be saved or activated 524. In an example, the object may be manually dragged or dropped to a map for setting the object's location.

Now turning to the option of creating 514 multiple instances of the object, the method may subsequently modify 526 properties and set 528 conditions. Further, the method includes generating 530 unites virtual good identifiers for the multiple instances. The method also includes setting 532 rules for location(s) and generation. Subsequently, these setting for the object may be saved or activated 534.

Subsequent to the steps of activating 524 and 534, objects are discoverable by users, or the objects may be generated when predetermined conditions are met.

In a non-limiting example, a software application or a script may be used to programmatically create new objects based on templates, and automatically assigned unique identifiers from a list or database of such identifiers. This example method can be useful for bulk object creation, or when a high number of similar objects need to be created. For example, a user with appropriate account privileges creates 1,000 virtual goods objects (3D coffee cups), of which it is determined that 100 can be generated per week over a ten-week period, randomly spawning at one or more designated locations, based on other set conditions such as, in a non-limiting example, no more than one per hour per location, but not on Sundays.

In a further non-limiting example, virtual goods objects can be associated with certain images (such as logos, pictures, or objects) that are recognized by image recognition or computer vision scanning. These images may include bar codes, QR codes, product packaging, billboards, posters, nametags, etc. In a non-limiting implementation, a virtual goods object may be associated with a logo or graphic on the side of a cereal box. In another implementation, the virtual goods object can be associated and linked to a movie poster. The application may use computer vision techniques for scanning and image recognition to trigger the generation of the virtual goods object from the image, and other conditional requirements may be met. Conditionals may include, but are not limited to time, date, location, the like, or other prerequisites, such as having other designated virtual objects or virtual goods in the user inventory. In this case, scanning a movie poster at one location may generate a virtual goods object, which may not be generated at a different location, or a completely different virtual goods object may be generated.

Figure 6:
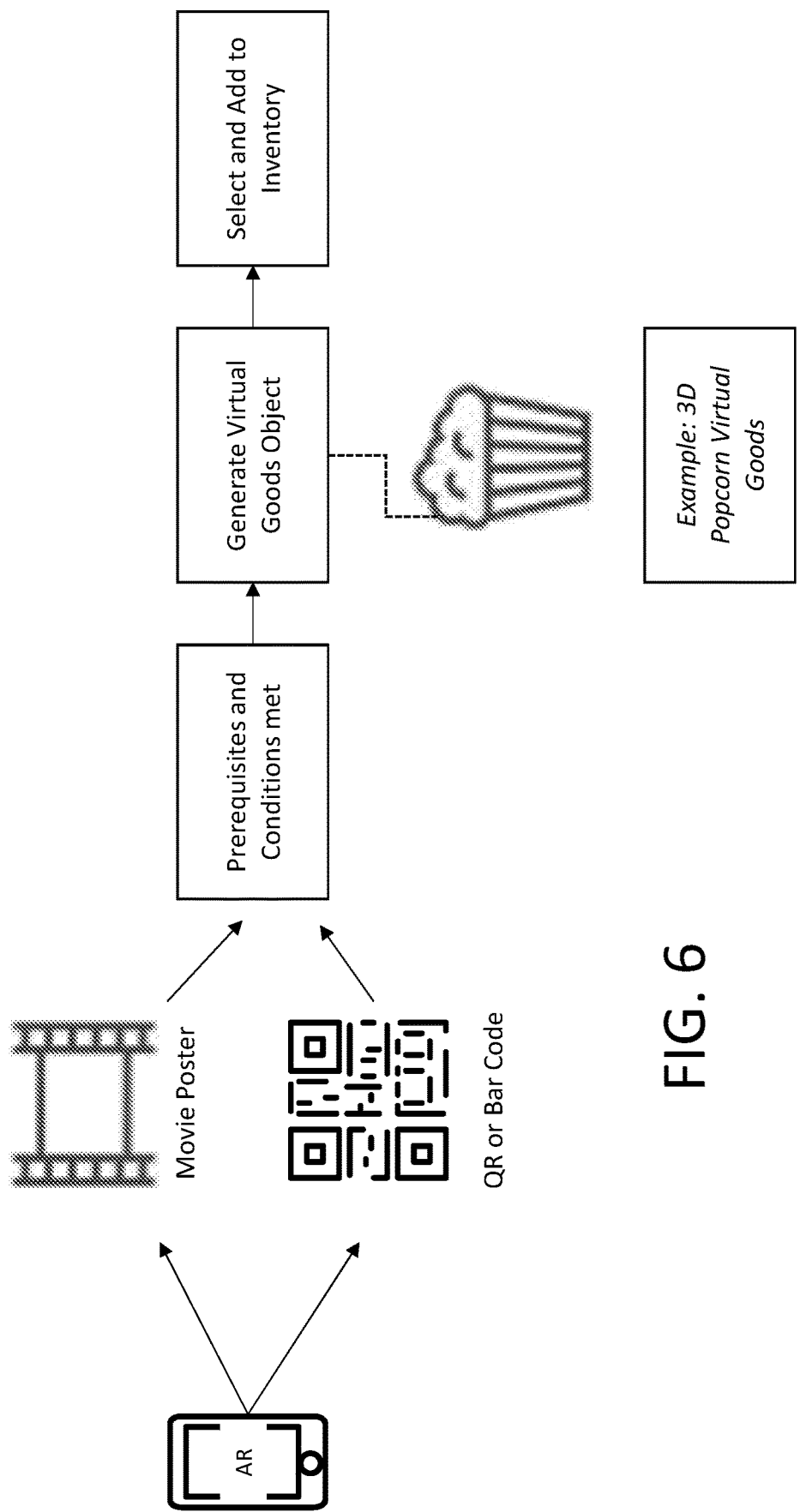
FIG. 6 is a flow diagram of an example method for associating images, codes and objects with conditionals according to embodiments of the present disclosure.

FIG. 6 illustrates a flow diagram of an example method for associating images, codes and objects with conditionals according to embodiments of the present disclosure.

Virtual objects and virtual goods objects may be acquired through a purchase from a marketplace; discoverable and acquired through using an augmented reality application or application used to access or display a 3D environment or world (these 3D worlds may or may not be virtual reality enabled); or received as part of a sale or trade transaction between two or more individuals; or received as a gift or reward for some other activity (such as "checking in" to a location, solving a puzzle or completing one or more tasks, completing some other transaction (like a purchase at a store or e-commerce), or as a prize in a contest. These virtual objects and virtual goods may be part of other objects or hidden in object containers (typically represented as a box, treasure chest, gift box, etc.), or created after the completion of a task or activity.

In a non-limiting example of an augmented reality usage, a user opens augmented reality application on a device, such as a smartphone or a tablet. The location of the user and device is determined using one or more methods including but not limited to GPS, WI-FI® triangulation, BLUETOOTH™, cellular, scanning a hardware device such as RFID or a beacon, querying a local augmented reality server or dedicated device, or selecting from a list of nearby locations on the app. Alternatively, computer vision techniques for image or object recognition can be used to locate and render the virtual object or virtual goods. The difference from standard augmented reality uses (GPS geolocated and or image/object recognition) is that these objects are collectible, transferable, and can be redeemed or exchanged for other objects or real-world goods or services.

In accordance with embodiments, an application may have a map view that shows nearby AR content, objects, people etc., as well as a "live" view which is a video feed from the device camera, upon which is overlaid a user interface and graphics that indicate virtual objects are nearby or rendering them in 3D space on top of the video feed if they are in proximity to the user.

The user can approach nearby objects until they are close enough to render in the live view, and once viewed in this manner, they can use the app interface to select the object and acquire it ("picking it up"), adding it to an inventory list that is part of the application.

Figure 7:
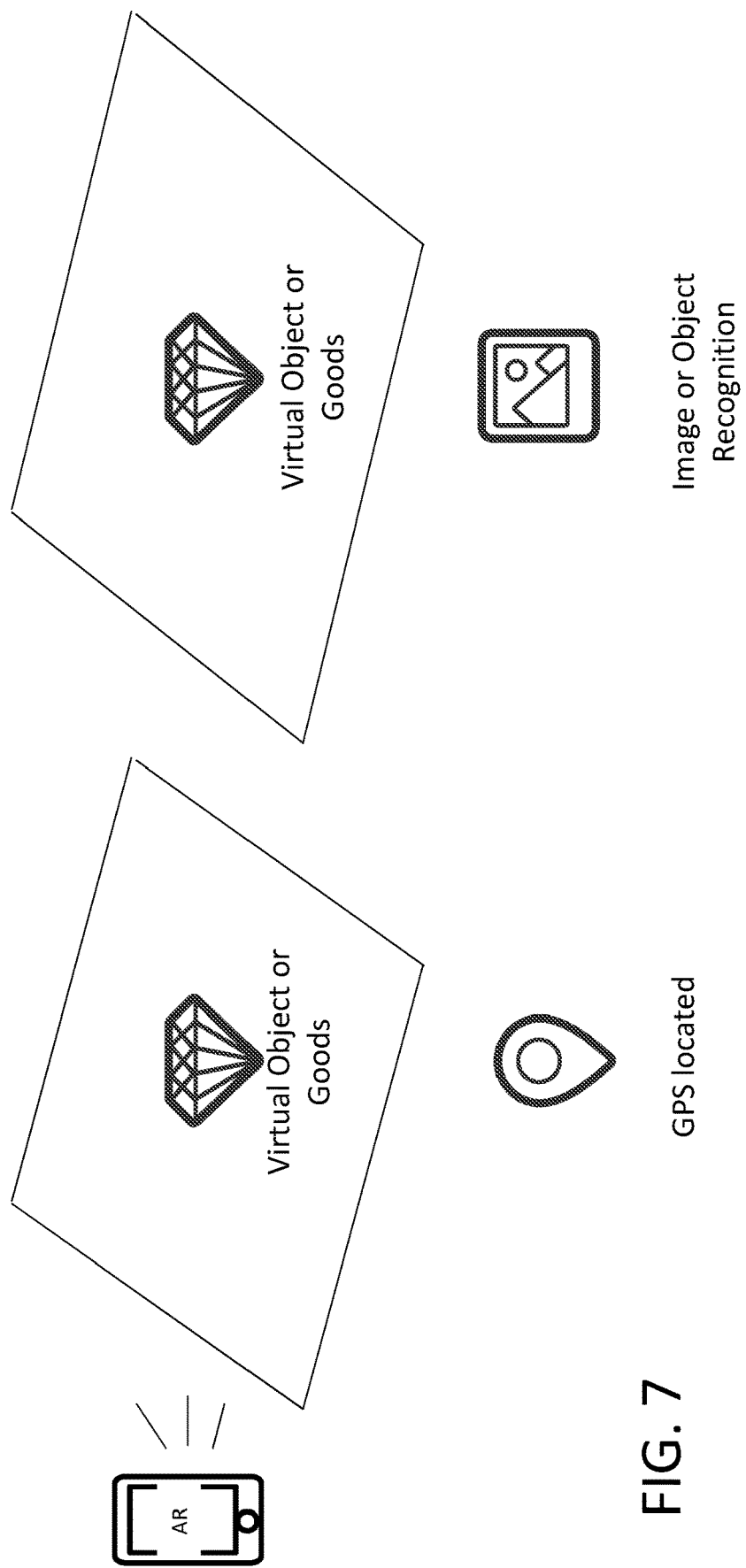
FIG. 7 is a diagram showing an augmented reality example according to embodiments of the present disclosure.

FIG. 7 illustrates a diagram showing an augmented reality example according to embodiments of the present disclosure.

In an additional non-limiting example, discovery and acquisition of virtual objects that are enabled as virtual goods may also occur in other applications such as games on mobile devices, smartphones, game consoles, arcade games, location-based entertainment, 3D games, 3D worlds, virtual worlds, massively multiplayer online games, virtual environments, and virtual reality. These objects may be picked up, added to inventory, or otherwise claimed and acquired by the user.

Virtual goods objects may be created through the platform and connected to the servers or application for the game, virtual world, etc. and populated, or generated, in those systems through an API. When the virtual goods objects are acquired, the servers or application communicates through the API to the virtual goods server or application, authenticating the transaction and validating the acquisition by the user. The virtual goods objects may then be transferred to any other application, server, game, virtual world, augmented reality application, etc.

Figure 8:
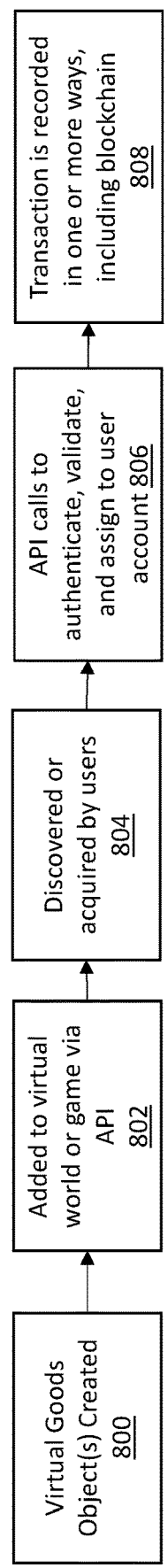
FIG. 8 is a flow diagram showing an example application for cross-platform, virtual world, virtual reality, and game use according to embodiments of the present disclosure.

FIG. 8 illustrates a flow diagram showing an example application for cross-platform, virtual world, virtual reality, and game use according to embodiments of the present disclosure. Referring to FIG. 8, the method includes creating 800 virtual goods object(s). The method also includes adding 802 to the object(s) to a virtual world or game via an API. Further, the method also includes discovering or acquiring 804 the object(s) by users. The method also includes API calls 806 to authenticate, validate, and assign to a user account. Further, the method includes recording 808 the transaction in one or more ways. Recording may be by, but not limited to, a blockchain technique. In an embodiment, creating 800 virtual goods object(s) and recording 808 the transaction in one or more ways, where the recording may be by, but is not limited to a blockchain technique, includes minting an NFT that is a 3D VGO.

In an example use case, virtual goods are created through an application, web interface, or through API on the virtual goods server, enabling the placement of the virtual goods within a third-party virtual world, game, virtual reality, website, chat program, social media platform, or other platform. When a player or user discovers or acquires the virtual goods object within those platforms, the servers are updated and the transaction is communicated via API to the virtual goods server and added to the user's account and inventory.

In a non-limiting example, in addition to finding and discovering virtual objects that are enabled as virtual goods, the user may acquire them through purchasing them through a marketplace that provides direct purchasing of virtual objects and virtual goods, or real-world merchandise. When directly purchasing virtual goods, ownership is transferred to the user, and they may exchange, activate, redeem, or convert the object in the future for the real-world goods; transfer, trade, or sell to another user. Alternatively, they may purchase real world goods and merchandise at a physical store, a website, or through a software application on a computer (such as a desktop) or a smart device (such as a smartphone or tablet). Purchasing the real-world goods or merchandise also gives the user the virtual goods object, which is representative of ownership of the real physical objects.

In a non-limiting example, in accordance with embodiments, users may acquire virtual goods objects through transfer, trade, or sale with another user. In this example, User1 has previously acquired the virtual goods object, and transfers it to another user through any of a variety of means that include but are not limited to: in-app trade or transfer; list for trade or sale on a website or marketplace; remove from inventory and place in an augmented reality scene, game, or 3D environment (similar to discovery in Examples 6 and 7); or transfer through some other platform such as email, SMS, instant messaging, or other cross-platform method that enables sharing of digital media. Users may also temporarily transfer (loan) a virtual object or virtual goods object to another user, maintaining ownership and redemption rights. Loaned virtual goods objects may not be exchanged, redeemed, transferred, or traded to other users, and will revert possession based on one or more conditions (such as a time limit).

Figure 9:
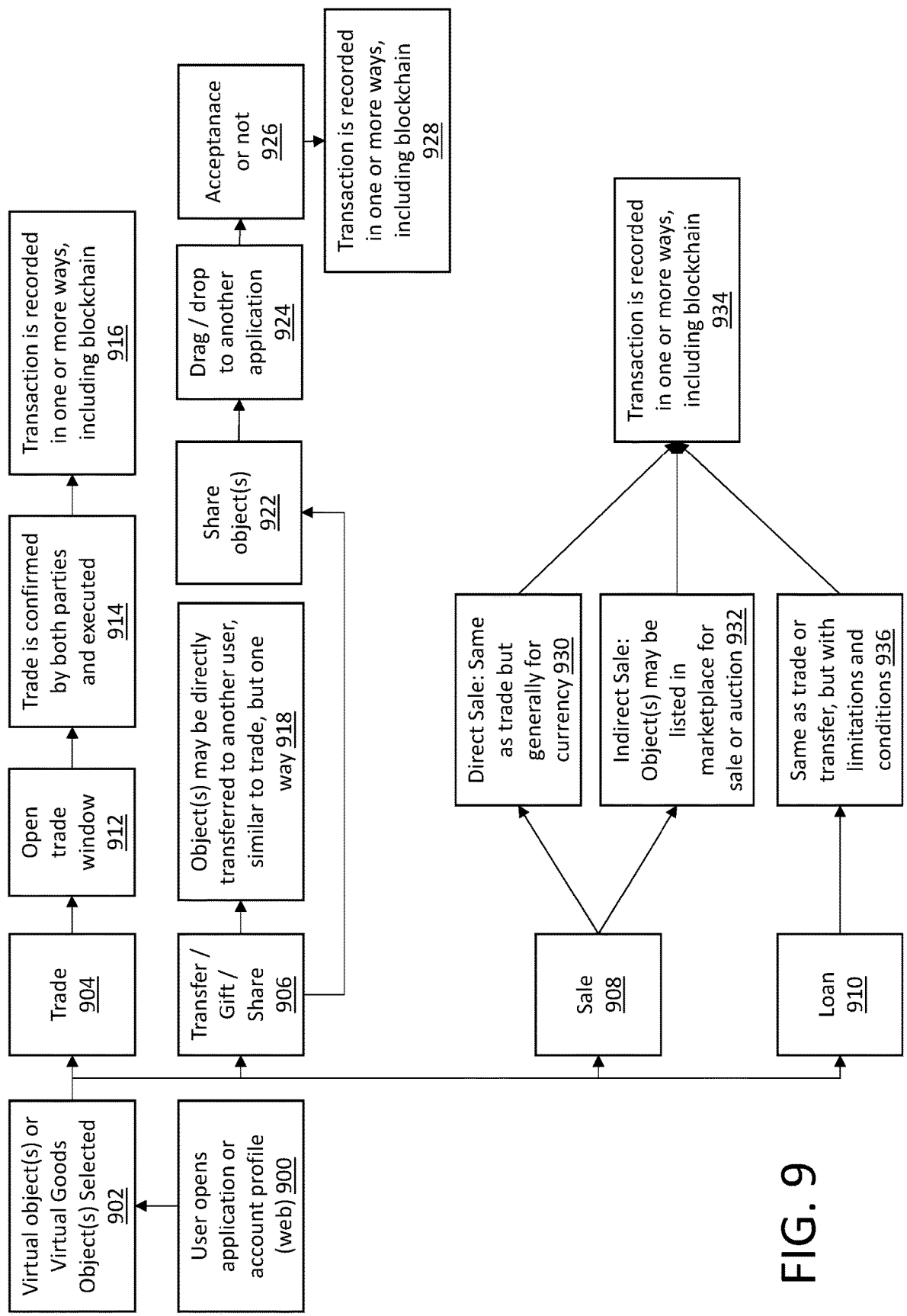
FIG. 9 is a flow diagram showing an example of trade, transfer, and sale according to embodiments of the present disclosure.

FIG. 9 illustrates a flow diagram showing an example of trade, transfer, and sale according to embodiments of the present disclosure. The method of FIG. 9 may be implemented by any suitable system such as the system shown in FIG. 2. For example, the method may be implemented by the computing device 102 and the server 202 shown in FIG. 2.

The method of FIG. 9 includes opening 900, by a user at a computing device (e.g., computing device 102 shown in FIG. 2), an application or account profile. Further, virtual object(s) or virtual goods object(s) may be selected 902. Subsequently, the user may optionally select to trade 904, transfer/gift/share 906, sale 908, or loan 910 the virtual object(s) or virtual goods object(s).

Turning first to the option of trading 904, subsequent to its selection a trade window is opened 912. During this time, both users may select one or more virtual objects or virtual goods objects to trade. The transaction may include currency or any other suitable exchange of consideration. Subsequently, a trade may be confirmed by both parties and executed 914. Further, the transaction may be recorded 916 in one or more ways, including blockchain. In an embodiment, a trade confirmed by both parties and executed 914, where the transaction is recorded 916, includes a user storing a VGO NFT in a crypto-wallet, transferring the VGO NFT to another user, and recording the transfer on blockchain.

Now turning to the option of the transfer/gift/share 906, the object(s) may be directly transferred 918 to another user. Further, for example, objects may be "shared" 920 across different cross-platform applications, similar to photo and link sharing using apps and social media. In this example, a user may select to share and drag and drop 924 the object to another application. Further, in this example, a recipient may accept the share/gift of the object, or otherwise the transaction is cancelled or reversed 926. Subsequently, the transaction may be recorded 928 in one or more way, including blockchain.

Now turning to the option of selling 908 the object(s), the method includes either directly selling 930 the object(s) or indirectly selling 932 the objects. Subsequently, the transaction may be recorded 934 in one or more way, including blockchain.

Now turning to the option of loaning 910 the object(s), the method includes implementing 936 a step that is the same as trading or transfer of the object(s), but with limitations and conditions. Subsequently, the transaction may be recorded 934 in one or more way, including blockchain.

In a non-limiting example, the presently disclosed subject matter may automatically create a virtual goods object or item based on user activity, actions, conditions, or the completion of one or more activities or tasks, which may or may not have a geolocal element or prerequisite.

In an example, a user interacts with an augmented reality application on a smartphone to complete a series of geolocated tasks and activities such as "checking in" to multiple locations and solving a 3D augmented reality puzzle at each location, scanning a QR code at each location, receiving a verification code through Near Field Communication (NFC), or some other task such as taking a photo of a recognizable landmark. Upon completing a series of these activities or tasks, a virtual goods object, which may be exchanged for some real-world goods, special offer, or merchandise, may be created and given to the user.

In another non-limiting example, multiple conditions may be met for virtual object or virtual goods discovery and/or creation. In this example of multi-factors or conditions, a user must be at or within certain distance of a specific location (geolocal), a time or date condition must be met, and the user must also have met some other prerequisite, such as completing a task or activity at a different location, or do some other activity such as scan an image, poster, sign, bar code, or QR code. Two or more of these conditions must be met to satisfy the multi-factor conditions to create the object and make it available or accessible to the user to discover, interact with, or acquire.

In another non-limiting example, some virtual goods objects can only be obtained through the collection of other virtual objects, which may or may not be virtual goods, or the combination of two or more virtual objects or virtual goods. In this example, User1 collects ten different virtual objects and virtual goods that are designated as a set or a collection. Upon completing the collection, a new virtual goods object is created and given to the user, which may then be traded, sold, transferred, or exchanged, activated, redeemed, or converted for the linked real-world goods.

In a variation of this example, User1 collects ten instances of a particular virtual object, which can then be combined into a new virtual goods object (thus destroying the original ten instances) which is created and given to the user, which may then be traded, sold, transferred, or exchanged, activated, redeemed, or converted for the linked real-world goods.

In another non-limiting example, virtual objects and virtual goods objects, represented as 2D icons or images (static or animated) or as 3D objects, can be transferred from one application, such as an augmented reality application, or web interface, such as a user account or profile page with an inventory listing of virtual objects and virtual goods, to another user directly or indirectly through another cross-platform application. This information includes but is not limited to instant messaging apps, social media sites, SMS, or other social media applications, or viewers, or game applications.

This part of the present disclosure can be the method and process of transferring a 3D object virtual good (i.e., a 3D coffee cup that can be redeemed for a free coffee at Starbucks) to another user through social media integration.

The system may enable a user to find or discover the 3D coffee cup with their AR application, trade it to other users, or exchange/redeem it for real world goods (free coffee). They can also place the object in an AR scene where it can be discovered, interacted with, or acquired by other users.

In this implementation, the user can access their AR app, open an inventory tab or window, showing all of the 3D objects and virtual goods they own and that is associated with their device, and "share" it with another user through social media integration (i.e., SMS, email, Facebook Messenger, WhatsApp, Skype, WeChat, etc.) in the same fashion that users share a web link, an image, a gif, or a file.

When the recipient clicks the object/link the transaction is communicated to a server or local node, and fully transferred to the new user. They may then treat the virtual goods object as the original user by saving it to inventory, placing it in an AR scene, transfer it to another user, or exchange/redeem the object.

Figure 10:
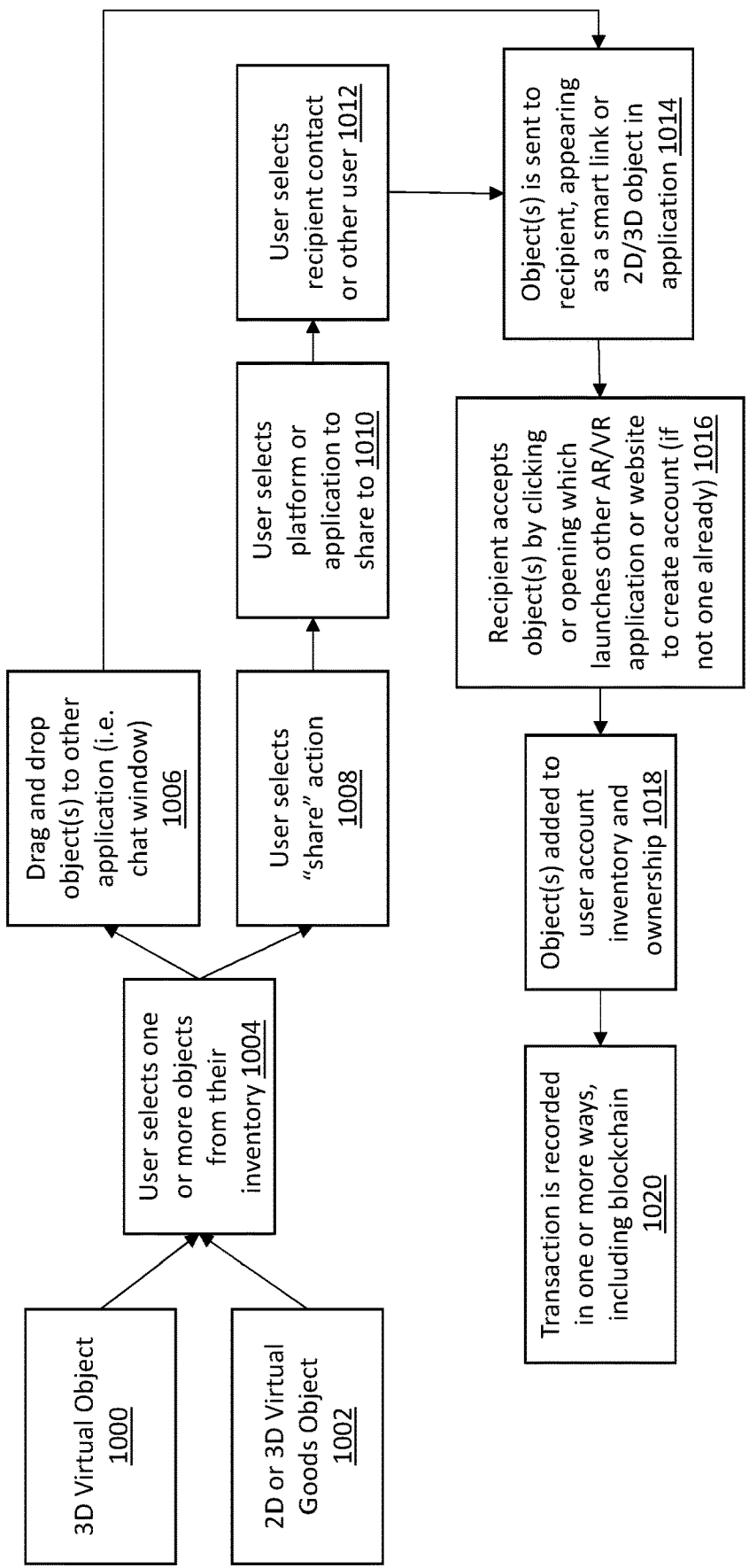
FIG. 10 is a flow diagram showing a social media integration example according to embodiments of the present disclosure.

FIG. 10 illustrates a flow diagram showing a social media integration example according to embodiments of the present disclosure. The method of FIG. 10 may be implemented by any suitable system such as the system shown in FIG. 2. For example, the method may be implemented by the computing device 102 and the server 202 shown in FIG. 2.

Referring to FIG. 10, the method includes providing a 3D virtual object 1000 or a 2D/3D virtual goods object 1002 in a user's inventory. Subsequently, the user may select 1004 one or more of the objects from the inventory. In one option, the user may drag and drop 1006 the object(s) to another application. In another option, the user may select a "share" action 1008.

Subsequent to step 1008, the user may select 1010 a platform or application to share to. Further, the user may select 1012 a recipient contact or other user for sharing. The method also includes sending 1014 the object(s) to the recipient. Further, the recipient may accept 1016 the object(s) and the object(s) may be added 1018 to the other user's account inventory and ownership. Subsequently, the transaction may be recorded 1020 in one or more way, including blockchain.

In an example use case, User1 is at Starbucks, turns on their app, and discovers a 3D coffee cup in the middle of the café. They select and acquire the object, adding it to their inventory. They could immediately exchange it at the order counter for a free small regular coffee, but they choose to send it via Facebook Messenger to a friend in another state. That friend accepts the object, adding it to their app inventory. They then drive over to a local Starbucks and exchange it for a free coffee. While they are there, they also buy a bagel. This drives traffic and new business to Starbucks.

In another variation, User1 opens an augmented reality application, selects a virtual object or virtual goods object, selects a share or trade option, and then selects a user contact through some other application, in a similar fashion as how users currently share news, links, photos, and other media from one application to another. In the case of the present disclosure, certain properties and data related to the virtual object or the virtual goods are transmitted in addition to the graphical representation, updating the ownership of the object, and recording the transaction on one or more servers, databases, devices, and/or blockchain ledgers.

The receiving user may or may not be required to accept the transfer of the object and ownership, depending on the implementation of the application(s) use.

In another non-limiting example, a user with an application on a smart device (such as a smartphone or tablet) may use computer vision and sensor fusion techniques to recognize certain audio or visual cues from another source such as a radio or TV, which triggers an augmented reality experience, and which may trigger the generation of the virtual object or virtual goods in the augmented reality 3D space, that can then be picked up and acquired by the user.

In this non-limiting example, the user may be running an augmented reality app on their smartphone and the phone's camera is pointed at a television screen during commercials occurring in breaks of a sporting event. When certain commercials run, the app recognizes images or cues, and then creates 3D objects or other media, giving the appearance of objects or characters emerging from the screen, which are then possible to interact with, or pick up. These objects may or may not be enabled as virtual goods, which may be linked to real-world goods and merchandise. These objects may also be collections of objects, complete scenes, or animated characters "coming to life" in augmented reality.

Figure 11:
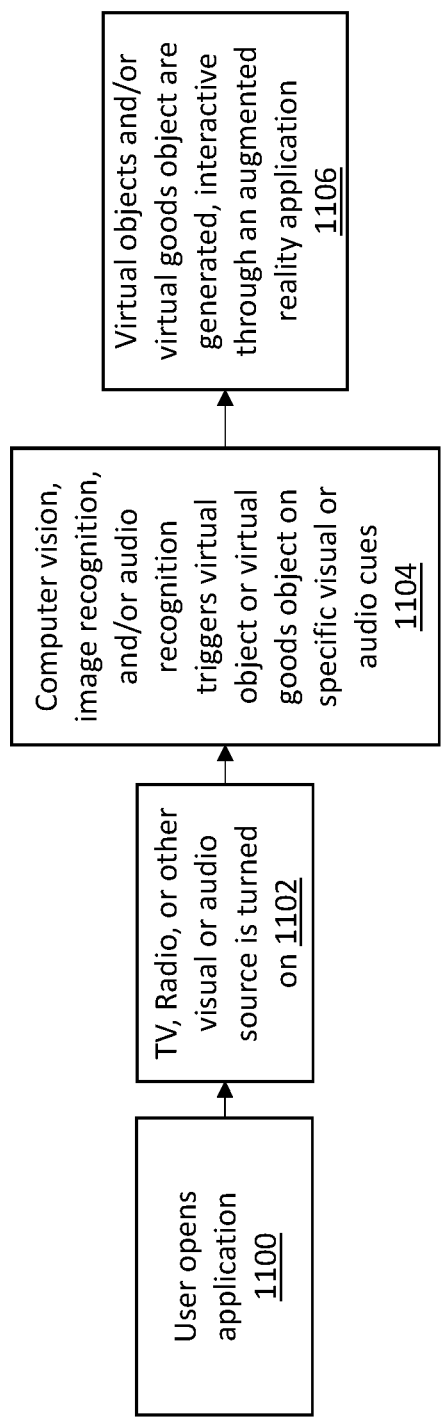
FIG. 11 is a flow diagram showing a multi-media and cross-platform sources example according to embodiments of the present disclosure.

FIG. 11 illustrates a flow diagram showing a multi-media and cross-platform sources example according to embodiments of the present disclosure. The method of FIG. 11 may be implemented by any suitable system such as the system shown in FIG. 2. For example, the method may be implemented by the computing device 102 and the server 202 shown in FIG. 2.

Referring to FIG. 11, initially a user may open 1100 an application. Subsequently, a television, radio, or other visual/audio source may be turned on 1102. Further, the method includes computer vision, image recognition, and/or audio recognition triggering 1104 a virtual object or virtual goods object on specific visual or audio cues. The method also includes generating 1106 virtual objects and/or virtual goods object being interactive through an AR application. These object and virtual goods may be singular or multiple, and may take any suitable form, including animated objects, characters, or scenes with multiple objects and/or characters.

In accordance with embodiments, virtual objects that are enabled as virtual goods which may be linked to real-world goods, assets, services, offers, merchandise, and more, can be exchanged, activated, redeemed, or converted into their real-world counterpart or the thing they are representative of or linked to. In another non-limiting example, a 3D virtual object of a pair of sneakers may be enabled as a virtual goods object and represents a pair of sneakers in the real world, or an offer, such as a discount when buying, or something like access to an event. In this non-limiting example, owning the 3D virtual goods object of the 3D sneakers grants the owner access to a VIP promotional event at a sneaker store where special deals or a private event is occurring.

In an embodiment, a data processor may be engaged to perform linking actions between physical objects, digital media assets, and virtual assets as enabled by a cryptographic token where the tangible physical item, digital media asset, and the cryptographic token are combined within a group of related objects and items. The data processor may link a tangible physical item to a digital media asset and link said tangible physical item and said linked digital media asset to a cryptographic token. In an embodiment, the link may create a redeemable ownership interest in one or more members of the group consisting of said tangible physical item, said digital media asset, and said cryptographic token. With these links between members of the group, the data process may facilitate the exchange of the redeemable ownership interest for a redeemed ownership interest in at least one member of the group consisting of the tangible physical item, the digital media asset, and the cryptographic token that are linked within the group. The data processor may also facilitate the exchange of any of said ownership interests from one entity to a different entity, and facilitate the recording of the exchange of the ownership interests on a cryptographic ledger with the cryptographic token.

These virtual goods objects can be exchanged, activated, redeemed, or converted in multiple ways. The presently disclosed subject matter is based on selecting a virtual goods object from an interface or list of objects; choosing to exchange, activate, redeem, or convert; confirming the action; verifying with the vendor; completing the process; and validating the transaction in one or more applications, databases, and transactional records, including blockchain and other methods. In some cases, the virtual goods object is destroyed or otherwise deleted from the system at this point, and in other cases, the properties of the object are updated to reflect that it has been used and is now a normal virtual object that is no longer linked to real-world goods.

In another non-limiting example, the whole process is contained within a system, platform, or network for augmented reality, virtual reality, or other virtual environment, 2D or 3D, game or otherwise, within a single application such as an augmented reality application on a smartphone or other device. The user can open the app, go to an inventory screen, select the object, select an option to exchange, activate, redeem, or convert the object, then confirms the transaction.

Information is then communicated to one or more servers and or databases, which then triggers a fulfillment process. In this case, since the whole transaction is occurring within the same system, user information and personal details, are already known, and the real-world goods or merchandise can be sent and shipped to the user by mail.

In one variation, a user goes to a website and buys a bouquet of 12 roses and opts to receive a 3D virtual goods object of the bouquet. The real-world goods of the bouquet are paid for and technically owned by the user, but not delivered or fulfilled as yet. The virtual goods object's properties are updated with information about the owner, the sale, and the transaction. In this non-limiting example, certain details may be encrypted or abstracted out and stored elsewhere using other data such as hashIDs, links, urls, unique object ID, etc.

The user may choose to redeem the object at a later date within the system, resulting in a shipment of a bouquet of roses to their address, or they may choose to sell, give, or trade the object to someone else, who can then redeem the object much in the same manner, except this time, the second user's shipping information is used, and the original owner's personal information is never disclosed.

Figure 12:
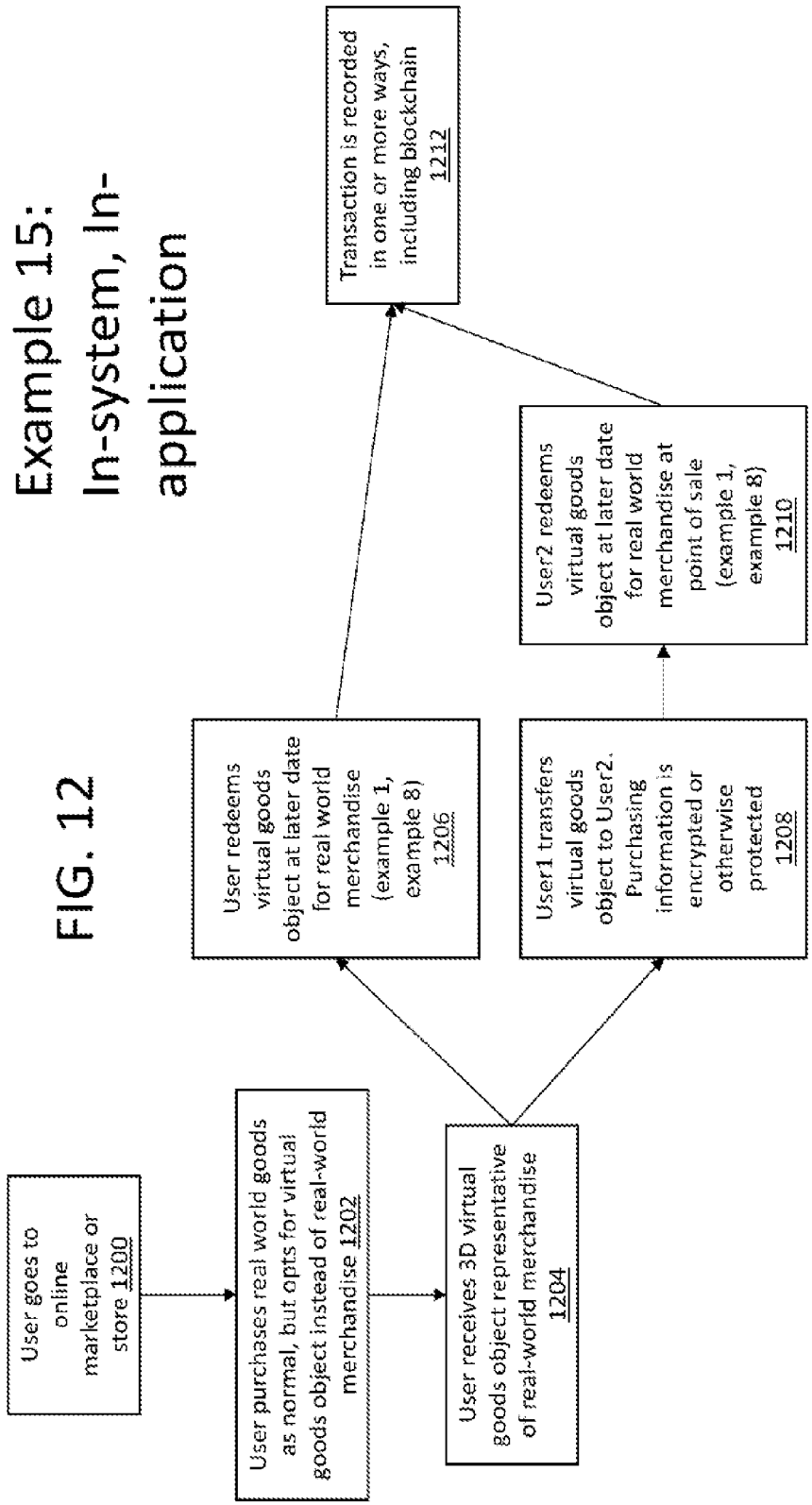
FIG. 12 is a flow diagram showing an in-system, in-application example according to embodiments of the present disclosure.

FIG. 12 illustrates a flow diagram showing an in-system, in-application example according to embodiments of the present disclosure. The method of FIG. 12 may be implemented by any suitable system such as the system shown in FIG. 2. For example, the method may be implemented by the computing device 102 and the server 202 shown in FIG. 2.

Referring to FIG. 12, the user may use 1200 a smartphone or other computing device to go to an online marketplace or store. Further, the user may user 1202 the smartphone to purchase real world goods, and opt for a virtual goods object rather than real world merchandise. The method also includes the user's smartphone receiving 1204 a 3D virtual goods object representative of the real-world merchandise. Optionally, the user may user the smartphone to either redeem 1206 or transfer 1208 the virtual goods object. Subsequent to step 1208, the user may redeem 1210 the virtual goods object. At step 1212, the transaction is recorded in one or more way, including blockchain.

In another non-limiting example, the user goes to a vendor, retailer, place of business, or venue, then uses a software application or web interface on a smartphone or other internet enabled device to access their account inventory, select and open the relevant virtual goods object, choose a redeem or convert function, and then display a unique code, bar code, QR code, or some other unique identifier at the point of sale, which is then validated at the point of sale, including but not limited to a scanner at a cash register, a hand scanner, RFID, Bluetooth, etc. or some other point of sale method, which updates the system. Alternatively, the user may enter a code, a unique code, or scan a bar code, QR Code, or some other identifier confirming the user is at the proper location and verifying the transaction. In either case, the redemption process may result in the destruction of the virtual goods object or change its properties to downgrade it to a simple virtual object.

In another non-limiting example, the user may use a different method, such as going to a website, adding a product to their cart, and then during the check-out process, enter in a code that results in applying a price change to the goods or merchandise in the cart to reflect the virtual goods object.

To illustrate, the user opens an app or a website to access their account and inventory of virtual goods objects, selects an object, opens a properties dialog or window, and selects one of the unique identifiers or codes for the virtual goods object. This is entered during the check-out process. If the virtual goods object was designated as worth one pair of sneakers for free or at a discount, the equivalent price change would occur in the cart. Upon finalizing the order, the system can be updated, confirming and validating with the merchant, resulting in the shipment of the goods or merchandise to the user.

Part of the present disclosure may include interacting with augmented reality or virtual reality content, such as a simple or complex 3D object, collection of 3D objects, such as a switch, button, dial, 3D key and keyhole or lock, an interactive puzzle such as a 3D Rubik's cube, etc., which must be properly interacted with, solved, or some other conditional interaction, in order to lock, unlock, hide, or make visible, or gain/restrict access to some other object(s) or content.

In another non-limiting example, a user may find or acquire an object, such as a 3D key of a certain type with certain behaviors and properties and use it to interact with another object such as a keyhole or a lock in AR or in VR. These properties may then satisfy a condition to gain access or restrict access to some other content. Other conditions or requirements may include location, time, etc. or pre-requisites such as having one or more virtual objects or virtual goods already in inventory.

Unlocking a 3D chest with the proper key may subsequently give the user access to the contents inside of the chest. Or in another variation, going to a location and pushing a 3D button object or solving a 3D puzzle may subsequently make some other content appear or be accessible at that location, or at some other location.

In this part of the presently disclosed subject matter, a user may need to go to a real-world location, engage with AR content at that location, such as "a 3D button mounted on the wall in the food court at the local Mall", which can then satisfy a condition for making some content at that location or another location to be viewable or accessible. In this example, pushing the button at the local mall will reveal a 3D puzzle at another nearby retail location, which other users at that location could then access and solve, thus revealing content at yet another location, this time a local park.

In a similar fashion, interacting with objects that have conditional properties, requirements, or interactions in AR could affect content only accessible in the 3D mirror world associated with that location, or vice versa.

Figure 13:
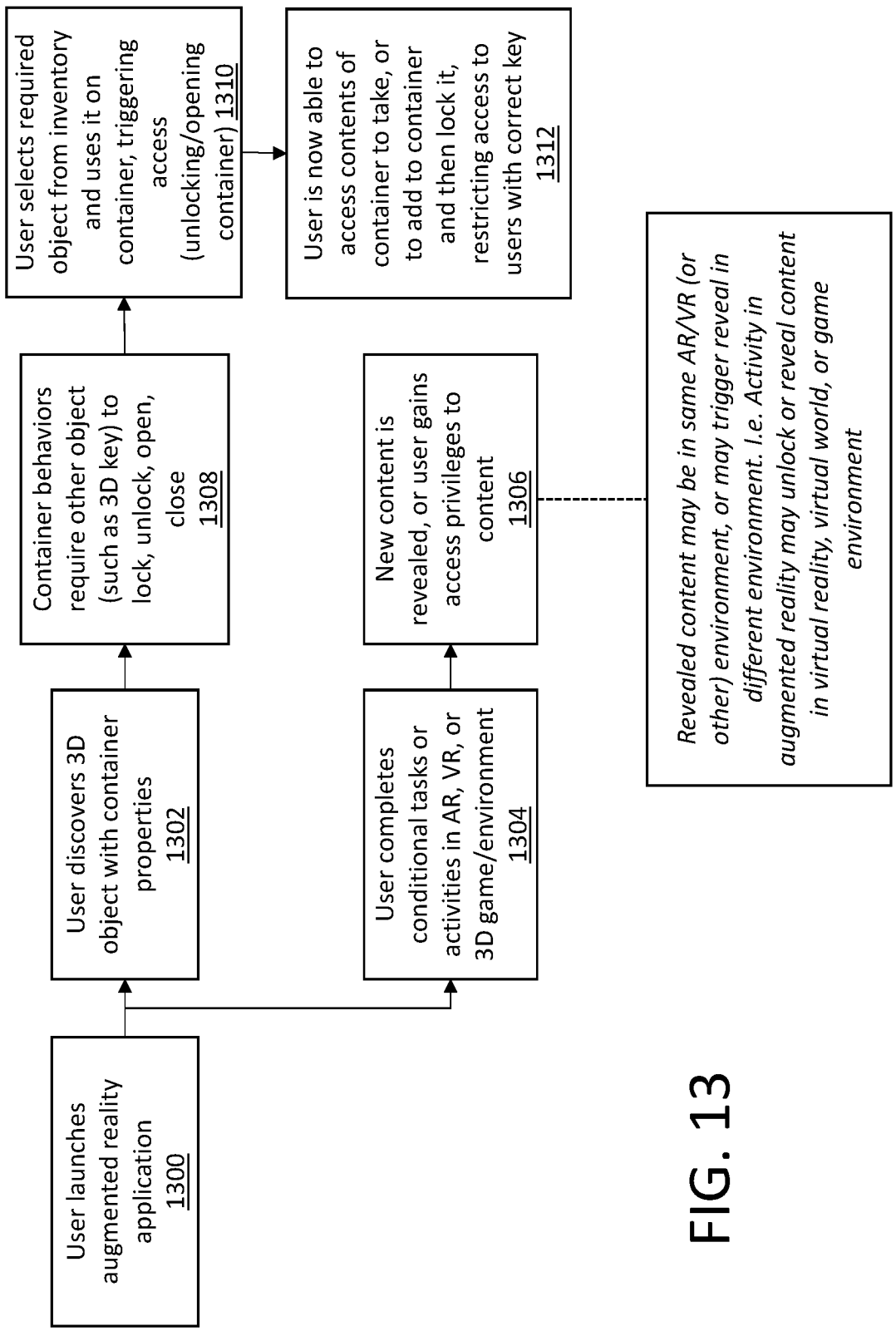
FIG. 13 is a flow diagram showing a lock/unlock/hide/reveal content example according to embodiments of the present disclosure.

FIG. 13 illustrates a flow diagram showing a lock/unlock/hide/reveal content example according to embodiments of the present disclosure. The method of FIG. 13 may be implemented by any suitable system such as the system shown in FIG. 2. For example, the method may be implemented by the computing device 102 and the server 202 shown in FIG. 2.

Referring to FIG. 13, the method includes launching 1300 an AR application. Further, the user may discover 1302 a 3D object with container properties. The method may also include the user completing 1304 conditional tasks or activities in AR, VR, or a 3D gaming environment. Subsequent to step 1304, new content is revealed, or the user gains access privileges to content (step 1306).

At step 1308, contain behaviors may require other objects to lock, unlock, open, close, or the like. The method may also include the user selecting 1310 a required object from inventor and using it on a container to trigger access to the container. At step 1312, the user is now able to access contents of the container to take, or to add to the container, and then lock it. Access may be restricted to users with the correct key.

The present disclosure can include multiple methods of communicating and verifying such interactions and changes that include but are not limited to platform to platform, direct server to server via API, or through a mediating server. In a non-limiting example, game server A communicates to another server B that acts as moderator or database with objects, properties, and behaviors, which then communicates to virtual world server C.

In a non-limiting example, real world devices, computers, mechanical, and electrical objects (collectively known as "devices") that are connected to a network or the Internet, etc. communicate with other objects, devices, computers, applications, and/or servers. When these devices are manipulated, activated, deactivated, or otherwise used or interacted with, the state, behavior, or property of a virtual object or virtual goods object or a collection thereof also changes.

In an example, a connected light switch or lamp when turned on or off in the real-world, would communicate through the network or other devices, and change the state, behavior, or properties of a virtual object or virtual goods object such as a 3D lamp in an augmented reality scene, a 3D scene, a virtual environment, a virtual world, or virtual reality environment into the corresponding on or off position.

In another implementation, locking or unlocking a door in the real world that is likewise linked to a network, other devices, computers, or applications, would change the state, behavior, or properties of a virtual door in an augmented reality scene, a 3D scene, a virtual environment, a virtual world, or virtual reality environment.

Conversely, actions and interactions to 3D virtual objects or virtual goods in augmented reality, virtual reality, virtual worlds, virtual environments, games, etc. would affect real world devices in the same manner, such as, in a non-limiting example, interacting with a 3D light bulb that can turn on or turn off a real-world light or light source with the same connectivity as described.

Figure 14:
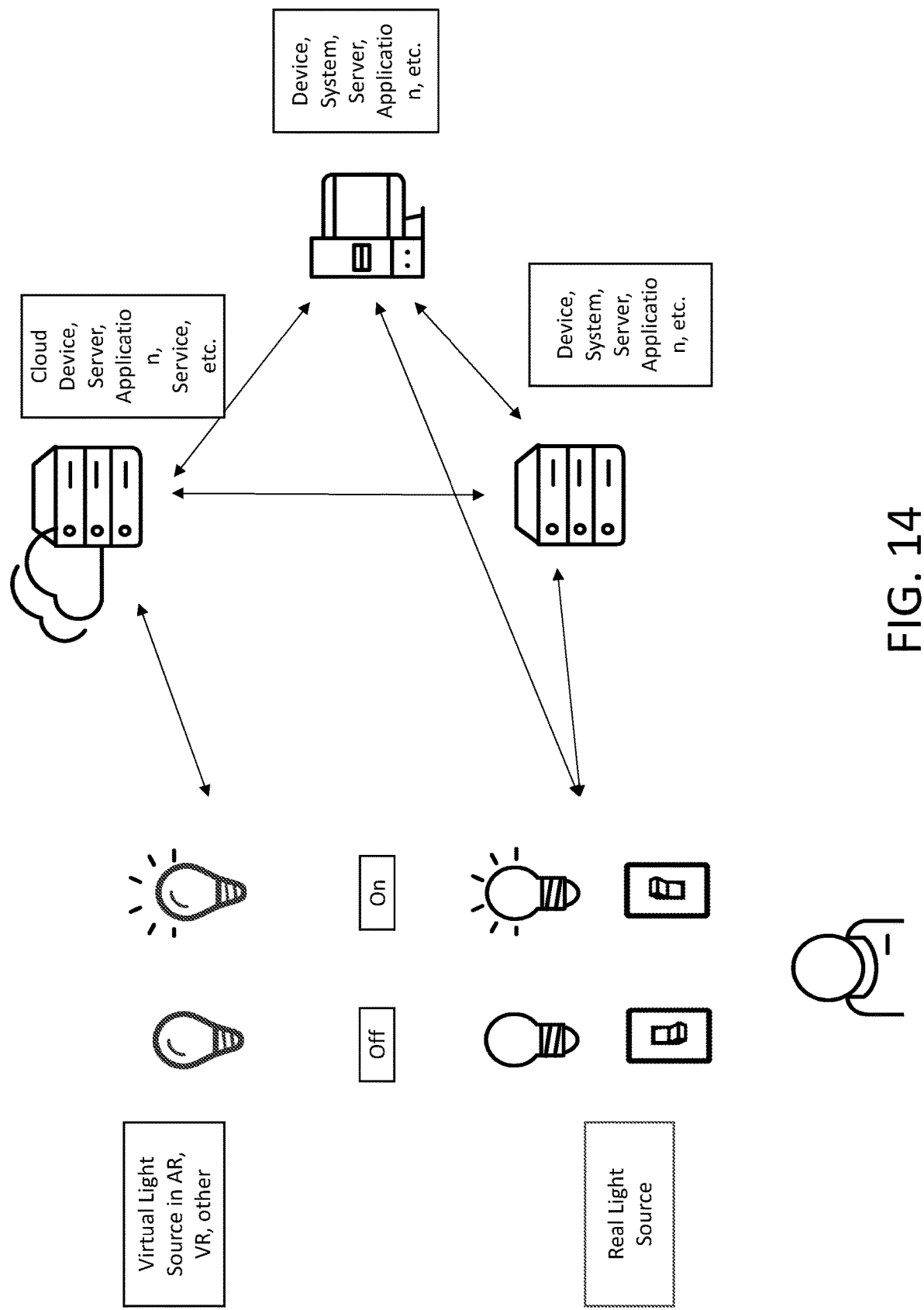
FIG. 14 is a diagram showing an example of state and property change according to embodiments of the present disclosure.

FIG. 14 illustrates a diagram showing an example of state and property change according to embodiments of the present disclosure. The method of FIG. 14 may be implemented by any suitable system have a data server or other processor.

Augmented reality applications are generally an application running on a device in a single-user implementation, or there is some server or cloud component that either serves content or provides for limited multi-user experiences, even if those experiences are not necessarily shared experiences where users are interacting with the same instance of content.

Server elements may be client/server based, where the user application interacts with one or more remote servers in a specific configuration, or distributed among multiple servers or virtual machines in a cloud-based configuration.

The presently disclosed subject matter may be based on a distributed and decentralized system where a "server" or "node" application runs on a device, such as a server, a dedicated device, such as a computer, server, desktop, tablet, smartphone, etc., that is limited in scope and dedicated to serving one or more specific locations and is generally physically located at or near the location being served instead of remotely "in the cloud" or on a server farm.

This local node server application stores all 3D mapping data, the location of any/all 3D objects, geospatial positions of real-world devices, sensors, peripherals, and IoT devices, maintains the states and properties of all content at the location, provides access control and user privileges, tracks and records all activity and transactions, maintains geolocal blockchain records and history, maintains one or more databases, and acts as a server for all geolocated augmented reality, virtual world, and virtual reality experiences specific to that location.

Each local node communicates with other nearby geolocated nodes, sharing information, backing up data, validating users, activity, mapping, and transactions, as well as communicating certain data to other remote servers. Any node can communicate with other nodes or servers to authenticate user identity, transaction history, activity, and virtual object or virtual goods ownership.

In another non-limiting example, an application may be installed and run on a user's home desktop computer or dedicated computing device. It stores all 3D mapping data, the location of any/all 3D objects, geospatial positions of IoT, sensor, and other devices, maintains the states of the content, controls access to content, in a non-limiting example, known as privilege-based access system, tracks all activity and or transactions, records all activity and or transactions to one or more blockchains, etc.

This node or server is the primary or master controller for the location and is registered to the location. User applications, generally an AR app that runs on a device, connect to this server via WI-FI®, Bluetooth, TCP/IP internet protocol, cellular network, or any other communications methodology. The user applications may then authenticate the user, send and receive mapping data, handle localization, store content, media, and virtual objects (typically, but not limited to 3D), collects sensor data (from IoT devices, etc.), and so forth.

Figure 15:
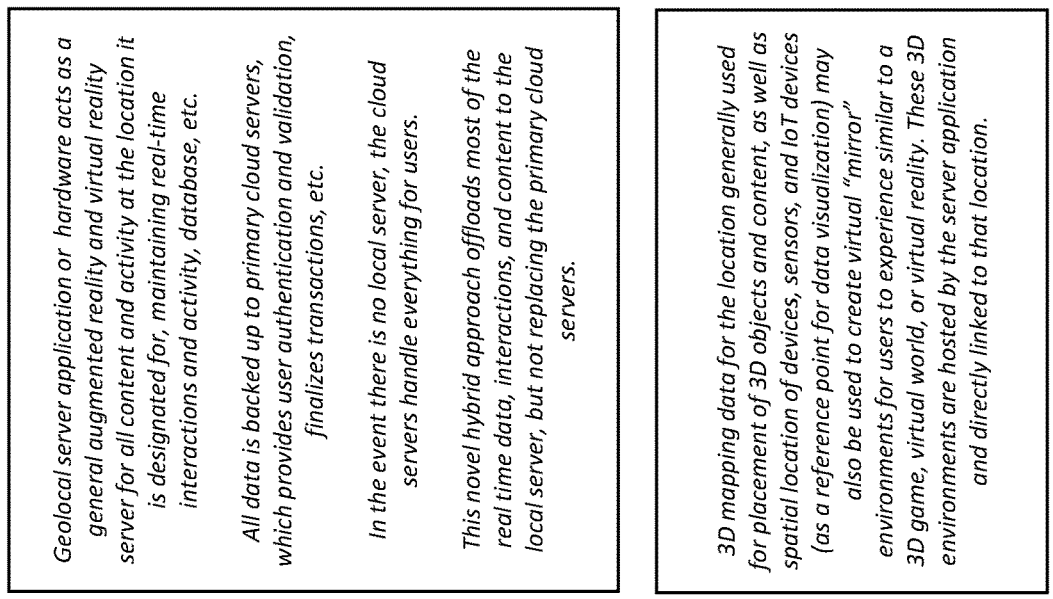
FIG. 15 is a diagram showing an example distributed and decentralized architecture according to embodiments of the present disclosure.
Figure 15:
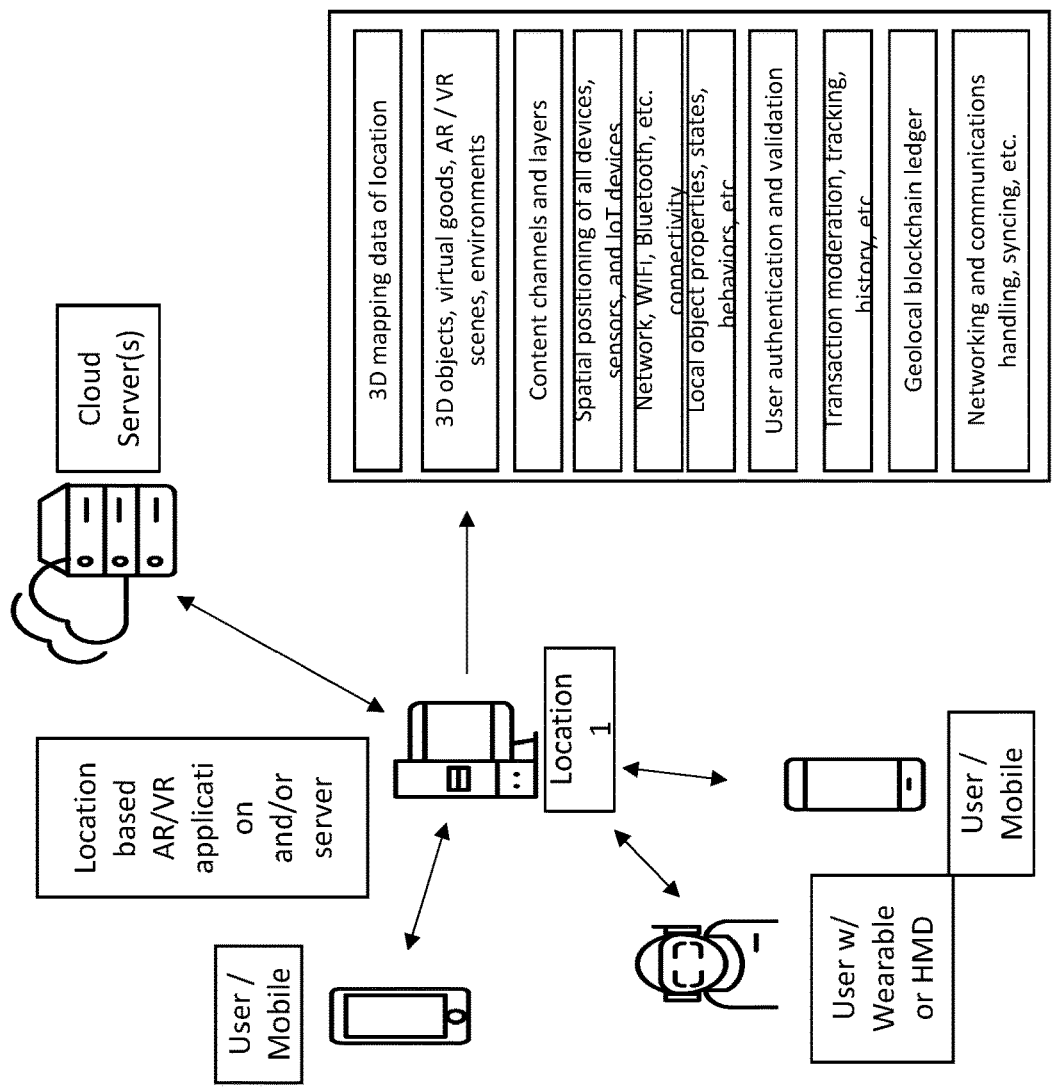

FIG. 15 illustrates a diagram showing an example distributed and decentralized architecture according to embodiments of the present disclosure. The method of FIG. 15 may be implemented by any suitable system such as the system. In a non-limiting example, the method may be implemented by the computing device 102 and the server 202.

The server or node also communicates with other local nodes, sharing necessary data in a distributed and partially decentralized fashion. Each node works with other nearby nodes for load balancing. In a non-limiting example, if too much user activity is happening at a location, a node may share some of the processing with other nearby nodes. All mapping and other AR content data is duplicated on a limited number of other nearby nodes and verified through blockchain validation. Changes on one node, such as, in a non-limiting example, user activity, changes to the mapping data, and other functions, are communicated to these other nearby nodes, updating their database and data as necessary.

Figure 16:
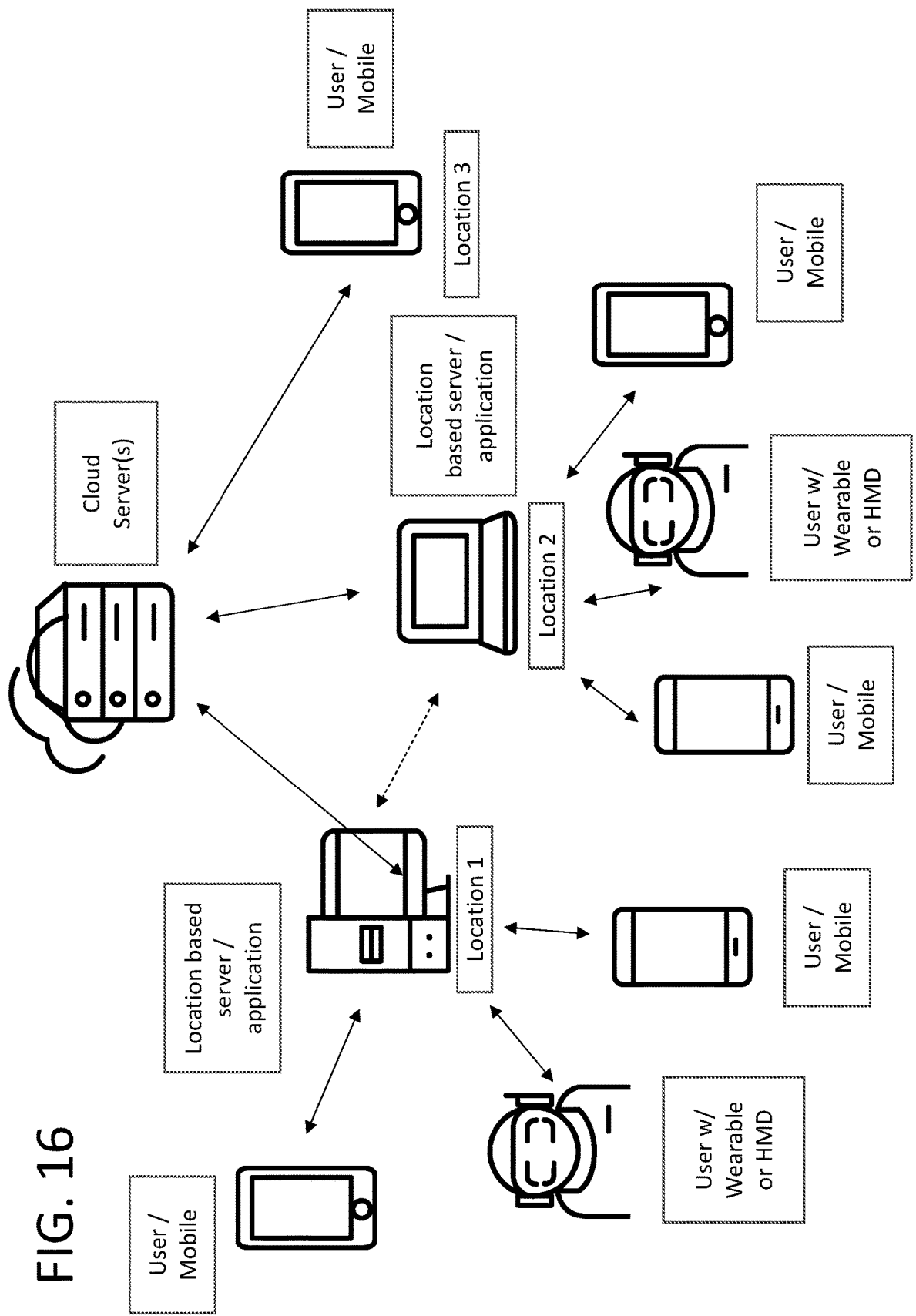
FIG. 16 is a diagram showing another example distributed and decentralized architecture according to embodiments of the present disclosure.

FIG. 16 illustrates a diagram showing another example distributed and decentralized architecture according to embodiments of the present disclosure. Geolocated AR/VR applications and servers or nodes communicate with nearby nodes and may overlap. This is used for backups of data, verifying changes, and load balancing between nodes in the same geographic area. All activity and transactions may be recorded to blockchain specific for that location and nearby areas. Local nodes act as consensus parties to verify transactions before committing to the blockchain.

On a regular or semi-regular basis, this data and changes to the data or transaction history of the blockchain are copied to other area or regional nodes/servers to back up the data, manage authentication, and ultimately record all transactions on one or more master blockchains.

While there are some efforts to bring blockchain to augmented reality or virtual goods/objects, this model of distributed nodes that are geolocated, with multiple levels of authentication, validation, consensus, etc. is novel primarily due to the geolocal aspect, and other elements of how the nodes interact with each other, instead of a single centralized server, "cloud", or "AR cloud".

In cases where a User with an app on a device wishes to map a location, or find and interact with augmented reality content and there is no local node that has previously been designed to serve a given location where the User is at, the application communicates with a master server (login server, location server, or other), and the local data and content for the experience is handled on an area, regional, or national node until a dedicated local node is in place.

It is noted that a location may have one or more nodes serving it. In this case, the nodes interact and share load balancing and processing, while regularly updating each other and verifying activity and transactions between each other and other local, area, or regional nodes.

Any content that is hosted at that location, any transactions, such as user to user trade, sale, or any other transaction, or paid advertising at that location, may generate revenue that may be shared with the user that operates the local node as a royalty or profit sharing.

In another non-limiting example, while a User1 moves around in the real world, experiencing augmented reality overlays, the same mapping used for localization and placement of digital media can be used to create a mirror VR environment. A remote user can use a 3D application or VR to access that 3D environment, seeing 3D avatars representing users in the real world as they navigate around the location, while those users see a 3D avatar in AR space that represents the remote access VR user(s).

Later, User1 may be at home and logs into a system that enables a user to explore 3D environments, some of which are linked to specific real-world locations. User1 enters in data related to the location he was at earlier and access the map and a 3D experience of that map, which he can experience on his desktop computer like any other 3D environment, or he can experience it from a first-person point of view using virtual reality hardware, similar to User2's remote experience.

User2 may interact with the system through the user interface on a mobile device or may don a virtual reality head-mounted display and begins to explore the environment. As User2 is exploring the environment, the 3D world shows an avatar representing him moving around. User1, at the location, sees this avatar, life-size, maneuvering around the room through augmented/mixed reality, while User2 sees a 3D representation of User1 in the virtual environment.

If User1 moves a real-world object, the corresponding 3D object or bounding box in the mirror virtual world also moves and User 2 sees and experiences this change. In the same fashion, if User1 or User2 moves a 3D virtual object in either AR or VR, the object is similarly moved in the other environment.

Figure 17:
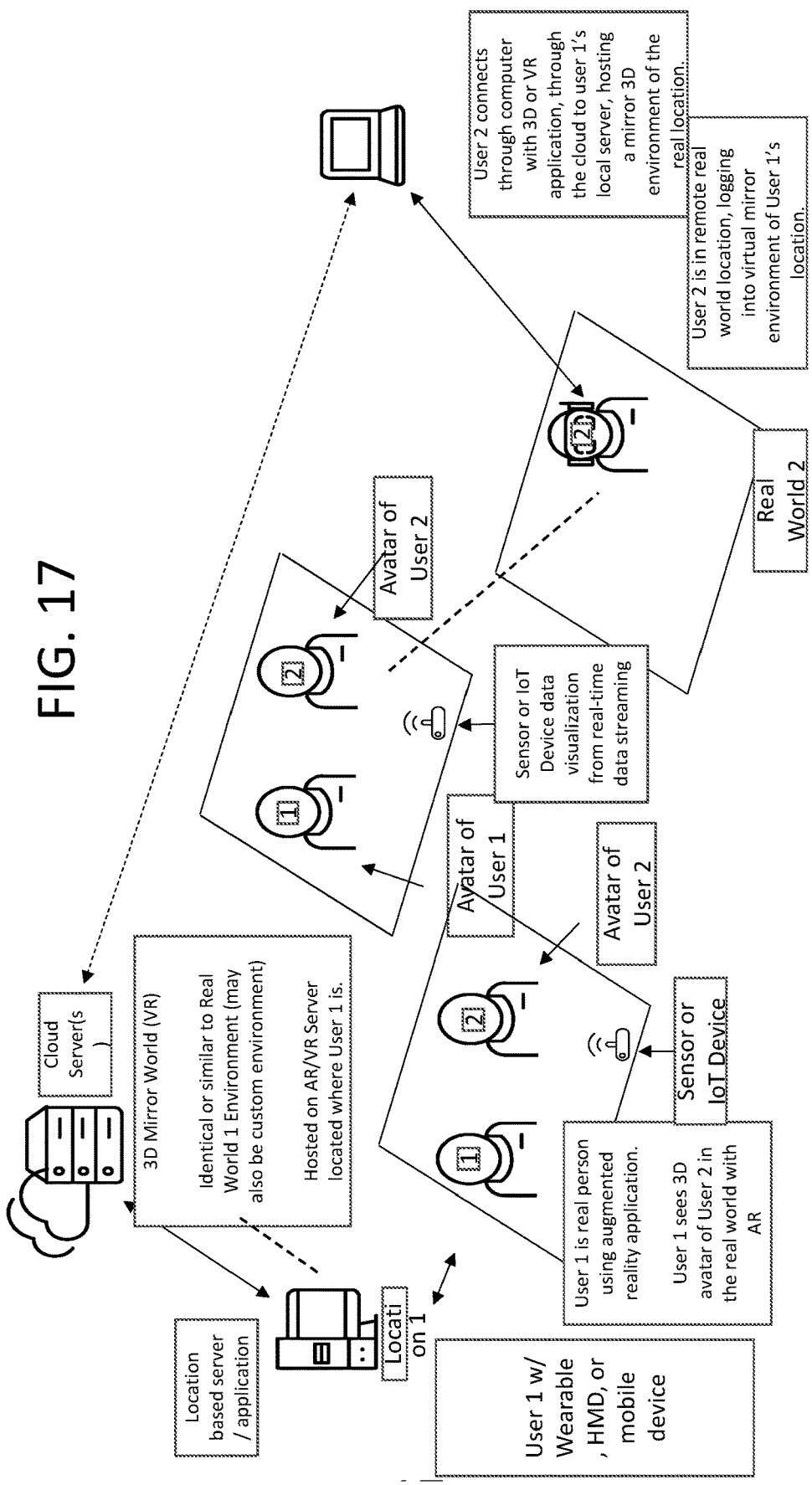
FIG. 17 is a diagram depicting an example of seamless Augmented reality and virtual reality blend according to embodiments of the present disclosure.

FIG. 17 illustrates a diagram depicting an example of seamless Augmented reality and virtual reality blend according to embodiments of the present disclosure.

In another non-limiting example, user1 has mapped their living room using any 3D scanning and mapping methodology. The resulting mapping data is stored on a server, dedicated server, device, dedicated device, server on the Internet, in the cloud, etc., and associated with their living room, home, address, and GPS coordinate. They create bounding boxes around objects and furniture in the living room, designate the location of other sensors and devices, their TV, smart lamps, electronic clock, etc., link each of those to the network so their data is now accessible to the location and authorized users to see the resulting data and data visualization.

User1 has a child. The child may use an AR enabled device such as a smartphone, tablet, wearable display, head mounted display, holographic projection system, or other AR enabled device to interact with the AR content.

Another remote user, such as a teacher or therapist, could login to the system and access the location as a standard 3D experience on a desktop or perhaps a VR system. Their experience is in a 3D mirror environment of the home, and a 3D avatar acts as their representation. As they move around the 3D environment, their avatar similarly moves around the real-world in AR, giving the child the impression and experience of interacting with the avatar. The location and orientation of the child is represented in the mirror environment as another avatar.

The avatars can be anything. Some users may choose to be represented by a shape, animal, fictional character, collection of shapes, or any 3D object such as a purple donut, a popular fictional character from a children's TV show, a celebrity, a unicorn, or other representative avatars.

In this case, the teacher or therapist can interact with the child in an educational, entertainment, or therapeutic fashion.

Similarly, other entertainment, educational, training, etc. experiences can be done for adults using different avatars and AR/VR content. Each local node server hosts one or more 3D maps of one or more locations.

This mapping data is primarily for three uses:
1) User Localization for determining the position and orientation of each User at the location, as well as real-world objects such as walls, floors, furniture, and other such objects.
2) The basis for a to-scale 3D virtual "mirror" world or environment
3) Content Localization provides the position and orientation of each 3D object or data visualization.

The third use, content location and positioning as well as the properties and states of each object, and other elements such as virtual lights, 3D physics, invisible objects such as generators which create new 3D objects, and many other elements of AR content and experiences, are categorized in channels and layers.

In a non-limiting example, Augmented Reality content at a location may be divided into multiple channels, and each channel can have one or more layers. The main channel, designated as a "public" channel" may have one or more layers, and each layer can be turned on or off making associated content visible or invisible to users, based on their access privileges. In general, any content on the public channel, and its layers, is visible at all times to all users.

Other channels and their layers are designated as private. The content on these layers is controlled by the user that creates the channel, and is not visible or accessible by anyone else, unless access privileges are granted.

Some channels or their layers may be designated as "subscription" channels, where any user can gain access privileges by paying a subscription fee to the creator of the channel which, in a non-limiting example, may be another user, a company, a service, a game, a data channel, or other users.

Channels and their layers may be limited to a specific location or may span multiple locations. For example, an augmented reality game created by a user or a third-party developer to run on the network, may have content at multiple locations, and any access or subscription rights to the channel carry to all locations.

Channels and layers specific to the location are controlled by the owner of the local server application, device, or node. Individual channels and layers for users are controlled by them.

Similarly, 3D mirror map, environment, virtual world, virtual reality content at the location may have one or more instances, each designated as public or private access.

Figure 18:
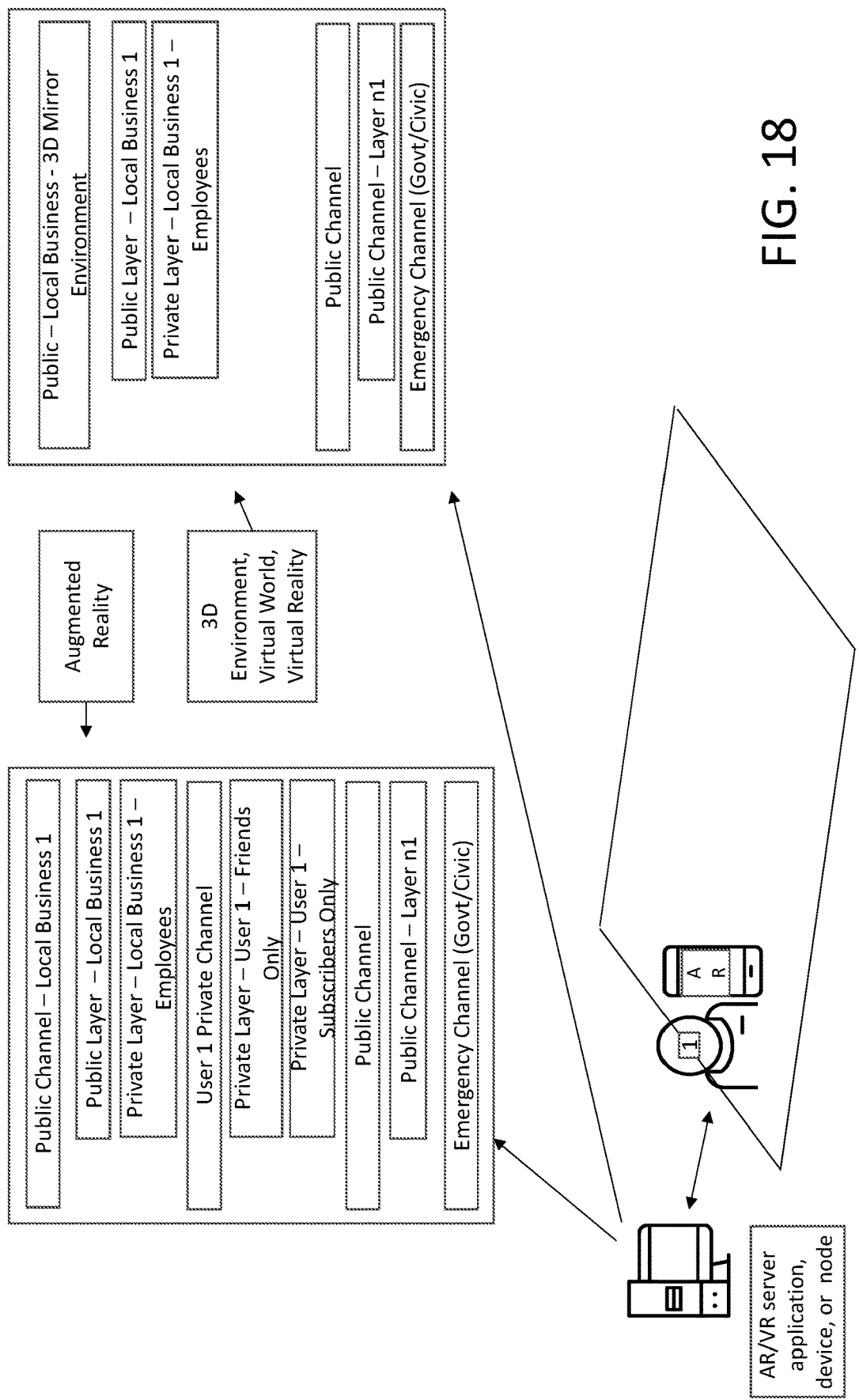
FIG. 18 is a diagram showing example use of channels and layers according to embodiments of the present disclosure.

FIG. 18 illustrates a diagram showing example use of channels and layers according to embodiments of the present disclosure.

In a non-limiting example, channels and layers can be specific to a location, such as a business; or specific to a user filtering their content at one or more locations to users with access. Any content creator (individual or business) can create content (usually one or more 3D virtual objects and virtual goods individually or collectively in a scene) that is available at multiple locations, but linked to a specific channel or layer within a channel, accessible only to other users with appropriate privileges.

In one case, a user may create a scavenger hunt game, with interactive puzzles at each of several locations, for users to experience and interact with at each location once they have been given access. Granting access may occur through one or more methods including manually adding their name to an access list, or an electronic invitation sent via SMS, email, social media, or other method.

In another use case, 3D avatars may be programmed to interact with users and placed at multiple locations around a city to give a teaching experience where the avatar talks to the user in AR or VR at the location, describing the history or interesting features of the location. All of these avatars and AR content may be placed on a single channel or layer that spans multiple locations and can only be viewed and interacted with if the user has appropriate access privileges.

Localization is the process where the user has a device and an application, which may be a smartphone or other device with an app, to determine their location (i.e., GPS, wifi-triangulation, beacon, etc.), then downloading or accessing the 3D mapping data for that location, then determining the position and orientation of the user and their device by analyzing the downloaded mapping data and comparing it to real-time data created by the app and computer vision techniques.

In a non-limiting example, the user application may get their location and/or mapping data from the cloud, from an internet-based server, from a server that is geolocated at or near the location which may be a dedicated device, or any computer that is acting as the primary host for mapping data or other functionality related to AR and VR, or they may query other Users in the vicinity that have already determined their location. Once location is determined, appropriate mapping data is downloaded or refreshed, or created from scratch if none previously exist, and device localization, that may be the geospatial positioning and orientation, begins.

Determine initial location through GPS, cellular triangulation, wi-fi login, wi-fi triangulation, or any beacon, or sensor network. Use this data to determine which map (or set of maps) to pull from server or nearby users that may already know location and position. After accessing maps, attempt rectification and localization for position and orientation. Download additional information, 3D assets, etc.

Localization 1: Where in the world am I? Generally, GPS coordinates, or self-selection (select which of these several locations that are nearby that I am at (similar to "checking in" somewhere using Foursquare or other application).

Localization 2: What is the position and orientation of my device at the location that I am determined to be at (geo+spatial).

Localization 3: Given the above steps, display augmented reality content and media in accurate positioning through the application that I am using.

Figure 19:
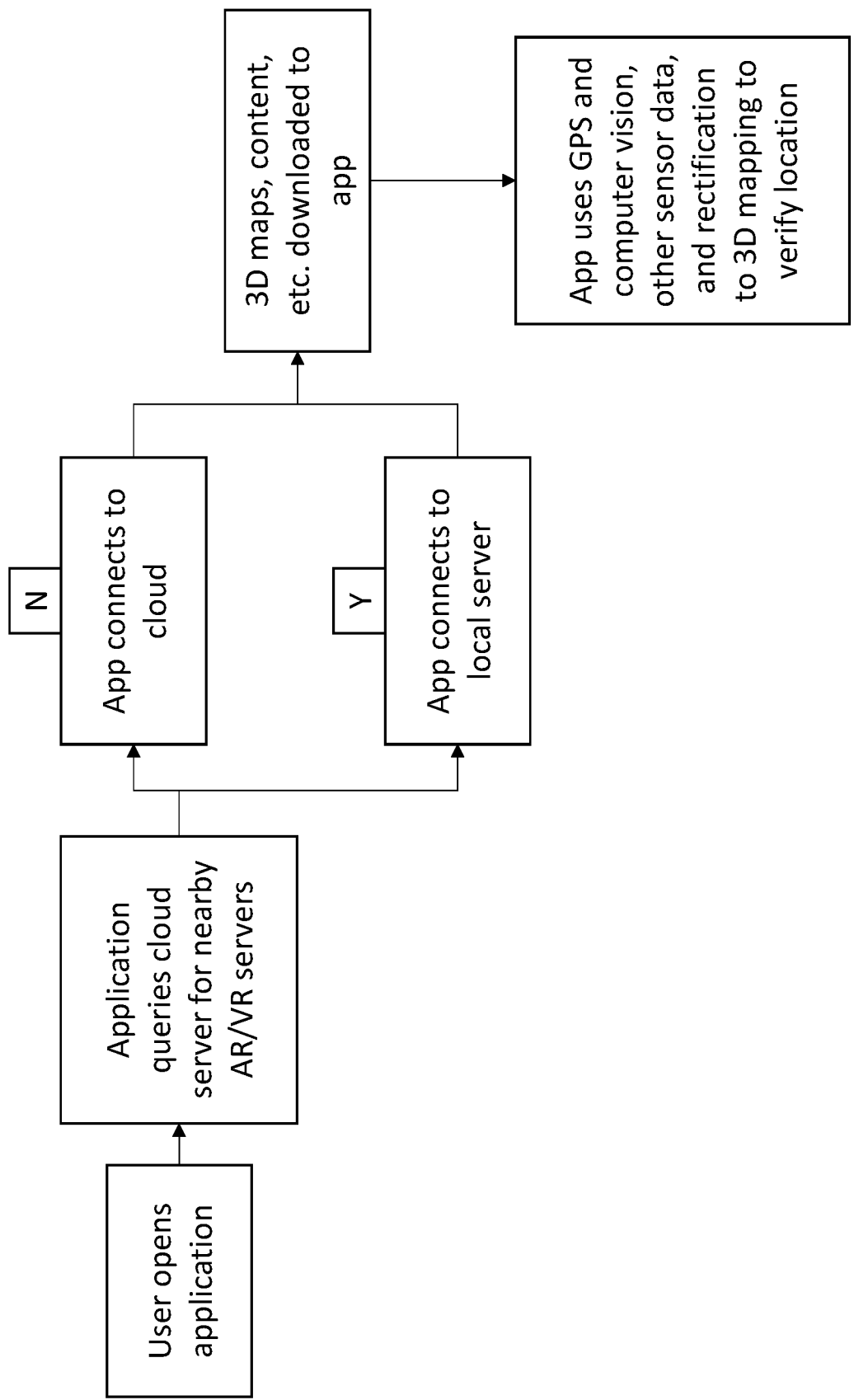
FIG. 19 is a flow diagram showing example localization and mapping according to embodiments of the present disclosure.

FIG. 19 illustrates a flow diagram showing example localization and mapping according to embodiments of the present disclosure.

Users discover and collect 3D objects, inclusive of virtual goods, using the application. These objects can be used to create interactive augmented reality and virtual reality content and scenes that are placed on the User's personal channel and divided or allocated to different content layers within the channel.

In another non-limiting example, content on the user's personal channel and layers is generally persistent or permanent. However, if the user wishes to put the content on a public channel or layer for anyone to see, they must pay a fee. This fee may be based on real-money, cryptocurrency, virtual currency, or some other cost, fictional credits, energy, points, hearts, fiat currency, or other exchange of value. This cost/fee provides "life" to the object or scene. Life is essentially a timer until the content is removed from the public channel, marked private, and/or returned to the user's private channel or inventory of 3D objects and content. Other users can likewise select the content and pay a similar fee to either upvote and extend the life/timer for the content, or downvote it, which shortens the life/timer for the content.

Other features include increasing the cost for the original user to restore the content to the public channel each time it expires or is downvoted by the community to expiry. Or each user may have an overall reputation that acts as a multiplier to the fees required to upvote/downvote content. A user with a high reputation may spend a point or a dollar to upvote content, where a user with a low or bad reputation may have to spend ten dollars to balance out or negate the vote of the high reputation user. Again, presently disclosed subject matter is part of the system of community driven content moderation based on fees, reputation, and content life cycle.

Figure 20:
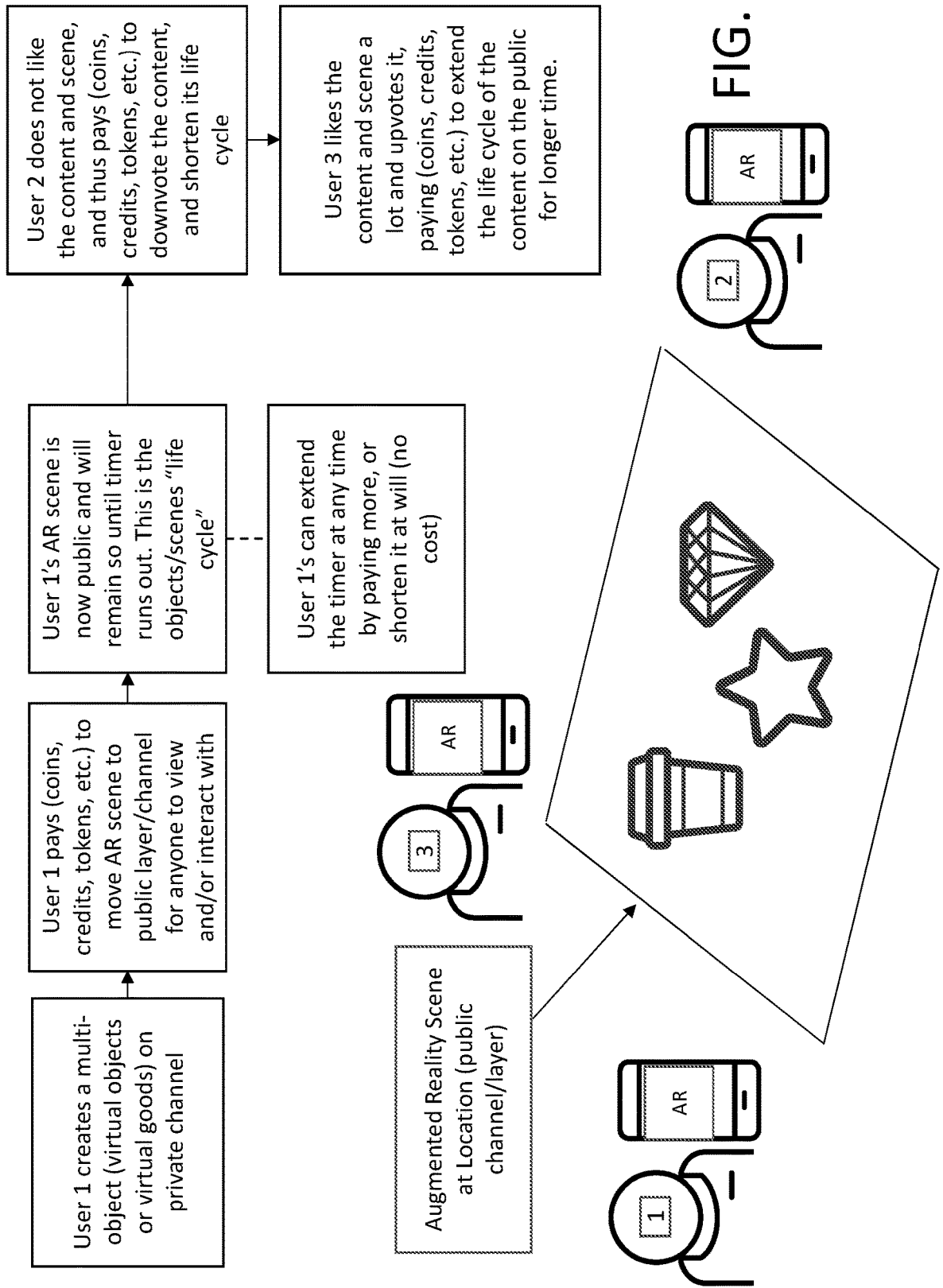
FIG. 20 is a diagram showing example life cycle+/−content curation and moderation according to embodiments of the present disclosure.

FIG. 20 illustrates a diagram showing example life cycle+/−content curation and moderation according to embodiments of the present disclosure.

Users may spoof GPS location using various methods, the presently disclosed subject matter requires that authentication of the User's location be confirmed to avoid fraud, abuse of the system, etc. In a non-limiting example, the User's GPS location is one of the primary data points which determines which 3D map to download and use for localization and access of content. Once the mapping data is downloaded, the attempt to accurately determine the user's position and orientation in relation to the map is also used to verify the User's actual location. If the data acquired by the device's camera cannot be rectified to the location's map, then it is assumed that the user is not actually at the location, and they are unable to access any AR experiences or content.

If the application running on the user device is able to determine geolocation and the software application is able to rectify position and orientation between data generated by the app and computer vision techniques using the device camera and the 3D mapping data associated with the location, then it is determined that the User is actually at the location and they may then engage with the AR content at the location.

Note that this also is part of the privacy protection in accordance with embodiments of the presently disclosed subject matter. If the user is determined to not actually be at the location, they may not access any of the AR content, or access any connected device (other User, sensor, IoT device, or any other device connected to the network at that location).

Figure 21:
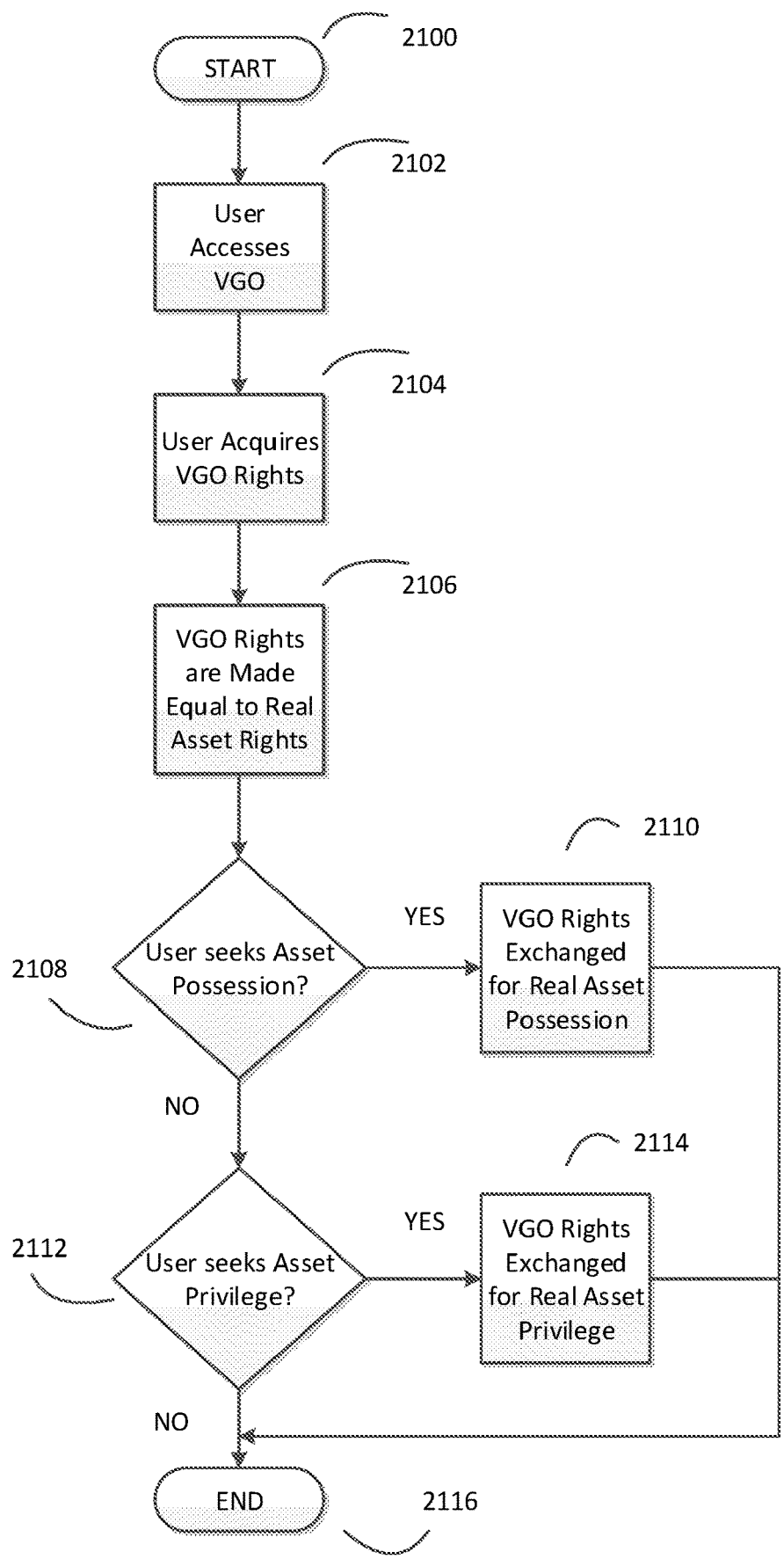
FIG. 21 is a process flow diagram illustrating VGO rights transfer according to embodiments of the present disclosure.
Figure 22:
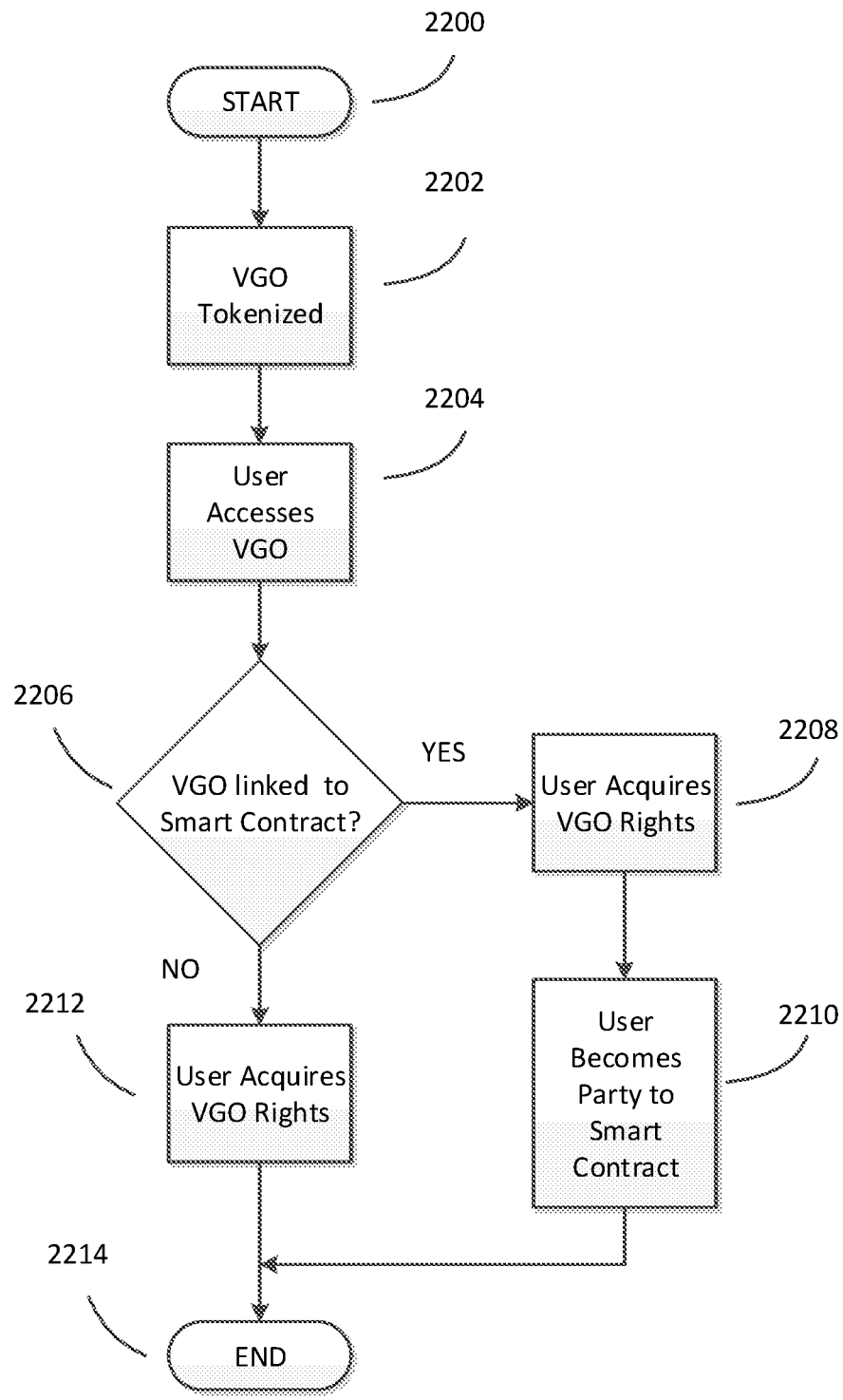
FIG. 22 is a process flow diagram illustrating rights tokenization and smart contract integration according to embodiments of the present disclosure.

Referring now to FIG. 21, a process flow diagram illustrating VGO rights transfer according to embodiments of the present disclosure is shown. At 2100 the process starts. At 2102 a user accesses a VGO in any 3D environment including but not limited to AR, VR, 3D world or environment, or 3D browser, viewer or application. At 2104 the user acquires one or more rights in the VGO by purchasing or otherwise being party to a transaction whereby rights to the VGO are transferred to the user from an original rights holder. At 2106, the instant innovation provides for a mechanism by which rights in the VGO are made equal to rights in a real asset. In a non-limiting embodiment, such rights equalization may be evidenced by tokenization of a VGO and/or incorporation of one or more smart contract into the rights transfer. If at 2108 the user seeks to possess the real asset, or to otherwise assert dominion over the real asset, then at 2110 the user may exchange the users newly acquired VGO rights for possession or dominion of the real asset, and the process ends at 2116. If at 2108 the user does not seek to possess the real asset, then at 2112 the user may seek some asset-related privilege, such as, by way of non-limiting example, exercising revenue sharing, or receiving a coupon for a purchase. If at 2112 the user seeks the asset privilege, then at 2114 the user exchanges the users newly acquired VGO rights for the real asset privilege, and the process ends at 2116. If at 2112 the user seeks no privilege, then the process ends at 2116. Referring now to FIG. 22, a process flow diagram illustrating rights tokenization and smart contract integration according to embodiments of the present disclosure is shown. At 2200 the process starts, at 2202 the VGO of the instant innovation is tokenized and may be considered as a NFT on blockchain. At 2204 the user accesses the VGO in any 3D environment including but not limited to AR, VR, 3D world or environment, or 3D browser, viewer or application. If at 2206 the VGO is linked to a smart contract, at 2208 the user acquires the VGO rights and at 2210 the user becomes a party to the smart contract, where the transaction is subject to the rights and responsibilities contained in the smart contract. The process then ends at 2214. If at 2206 the VGO is not linked to a smart contract, then at 2212 the user acquires the VGO rights simultaneously with the user's acquisition of the tokenized-VGO NFT. At 2214 the process ends.

While certain illustrative embodiments have been described, it is evident that many alternatives, modifications, permutations and variations will become apparent to those skilled in the art in light of the foregoing description.

I claim:

1. A system for optimizing transfer of asset ownership, comprising:
a data processor device comprising a communications module configured to communicate with one or more computing devices via a network;
the data processor linking a tangible physical item to a digital media asset, wherein a first link is created;
said data processor further linking said tangible physical item and said digital media asset to a cryptographic token, wherein a second link is created;
wherein the links created by said data processor create a redeemable ownership interest in one or more members of the group consisting of said tangible physical item, said digital media asset, and said cryptographic token;
where said digital media asset is cryptographically tokenized on a blockchain or other secure cryptographic ledger;
said data processor facilitating the exchange of said redeemable ownership interest for a redeemed ownership interest in at least one member of the group consisting of said tangible physical item, said digital media asset, and said cryptographic token;
said data processor facilitating the exchange of said ownership interests from a first entity to an entity different from said first entity; and
said data processor facilitating the recording of said exchange of said ownership interests on a cryptographic ledger with said cryptographic token.

2. The system of claim 1, wherein said redeemable ownership interest is in said digital media asset and said redeemed ownership interest is in said tangible physical item.

3. The system of claim 1, where the tangible physical item includes objects, assets, products, goods, physical merchandise, manufactured items, coffee, vehicles, art, gems, jewelry, tickets, title to a house or car, certificates of ownership, and other items having a physical existence in the real world.

4. The system of claim 1, further comprising intangible objects comprising services, coupons, special offers, vouchers, credits, privileges, physical access, currency, or cryptocurrency that are linked to said digital media assets and cryptographic tokens.

5. The system of claim 1, where said cryptographic token includes at least one member of the group consisting of metadata, descriptors, additional images, files, other digital media assets, smart contracts, code, scripts, and other information and data.

6. The system of claim 1, further comprising a unique identifier consisting of at least one member of the group consisting of a unique identification number, serial number, alphanumeric string, symbol, marker, image, hexadecimal, hash, code, or pattern represented, displayed, or accessed via barcode, a QR Code, an NFC device (chip or tag, etc.), a label, an RFID device (chip or tag, etc.), magnetic strip, and sensor.

7. The system of claim 6, where said unique identifier is associated with the tangible physical item and is recorded in one or more databases, ledgers, tokens, or cryptographic tokens on blockchain as part of the digital media asset.

8. The system of claim 1, further comprising a virtual goods object that comprises a tangible physical item, a digital media asset, and a cryptographic token where said virtual goods object is transferred as a single entity and where the exchange of the redeemable ownership interest in said virtual goods object results in the exchange of the redeemable ownership interest in each element of said virtual goods object.

9. The system of claim 8, where a new virtual goods object is created through the combination of multiple tangible physical items, multiple digital media assets, and multiple cryptographic tokens.

10. A method for optimizing transfer of asset ownership, comprising:
    linking a tangible physical item to a digital media asset;
    linking said tangible physical item and said linked digital media asset to a cryptographic token;
    wherein said linking creates a redeemable ownership interest in one or more members of the group consisting of said tangible physical item, said digital media asset, and said cryptographic token;
    wherein said digital media asset is cryptographically tokenized on a blockchain or other secure cryptographic ledger;
    facilitating the exchange of said redeemable ownership interest for a redeemed ownership interest in at least one member of the group consisting of said tangible physical item, said digital media asset, and said cryptographic token;
    facilitating the exchange of said ownership interests from a first entity to an entity different than the first entity; and
    facilitating the recording of said exchange of said ownership interests on a cryptographic ledger with said cryptographic token.

11. The method of claim 10, wherein said redeemable ownership interest is in said digital media asset and said redeemed ownership interest is in said tangible physical item.

12. The method of claim 10, further comprising managing the transfer of said redeemable ownership interest in intangible objects comprising services, coupons, special offers, vouchers, credits, privileges, physical access, currency, or cryptocurrency that are linked to said digital media assets and cryptographic tokens.

13. The method of claim 10, where said cryptographic token includes at least one member of the group consisting of metadata, descriptors, additional images, files, other digital media assets, smart contracts, code, scripts, and other information and data.

14. The method of claim 10, where said digital media asset comprises at least one member of the group comprising a unique identification number, serial number, alphanumeric string, symbol, marker, image, hexadecimal, hash, code, or pattern represented, displayed, or accessed via barcode, a QR Code, an NFC device (chip or tag, etc.), a label, an RFID device (chip or tag, etc.), magnetic strip, and sensor.

15. The method of claim 14, where said unique identifier is associated with the physical tangible item and is recorded in one or more databases, ledgers, tokens, or cryptographic tokens on blockchain or other cryptographic ledger as part of the digital media asset.

16. The method of claim 10, further comprising a virtual goods object that comprises a physical tangible item, a digital media asset, and a cryptographic token where said virtual goods object is transferred as a single entity and where the exchange of the redeemable ownership interest in said virtual goods object results in the exchange of the redeemable ownership interest in each element of said virtual goods object.

17. The method of claim 16, further comprising creating a new virtual goods object through the combination of multiple physical tangible items, multiple digital media assets, and multiple cryptographic tokens.

\* \* \* \* \*